United States Patent [19]
Maniwa et al.

[11] Patent Number: 5,768,483
[45] Date of Patent: Jun. 16, 1998

[54] METHOD OF REPORTING RESULT OF EXECUTION OF PRINT JOB IN NETWORK SYSTEM, METHOD OF SETTING SCANNING CONDITIONS IN NETWORK SYSTEM, AND NETWORK PRINTING/SCANNING SYSTEM

[75] Inventors: Yoshio Maniwa, Yokohama; Ikuo Okumura, Kanagawa; Yoshikazu Itoh, Yokohama, all of Japan

[73] Assignee: Ricoh Company, Ltd., Tokyo, Japan

[21] Appl. No.: 719,018

[22] Filed: Sep. 24, 1996

[30] Foreign Application Priority Data

Sep. 26, 1995 [JP] Japan .................. 7-248187

[51] Int. Cl.⁶ .................................. G06K 15/00
[52] U.S. Cl. .................. 395/114; 395/113; 395/106
[58] Field of Search ................. 395/114, 113, 395/112, 101, 115, 116, 106, 110, 117, 182.02, 181, 182.18, 185.01, 185.1, 200.3, 200.31, 200.33, 200.47, 200.49, 828, 835, 837, 838, 839, 859, 882, 892; 358/401, 408, 474, 471, 501, 505, 407, 468, 437

[56] References Cited

U.S. PATENT DOCUMENTS

| | | | |
|---|---|---|---|
| 4,513,390 | 4/1985 | Walter et al | 358/401 |
| 5,220,674 | 6/1993 | Morgan et al. | 395/110 |
| 5,287,194 | 2/1994 | Lobiondo | 395/114 |
| 5,530,554 | 6/1996 | Maehara | 395/114 |
| 5,577,172 | 11/1996 | Vatland et al. | 395/114 |
| 5,590,245 | 12/1996 | Leamy et al. | 395/114 |

*Primary Examiner*—Edward L. Coles, Sr.
*Assistant Examiner*—Dov Popovici
*Attorney, Agent, or Firm*—McDermott, Will & Emery

[57] ABSTRACT

A server machine queues print jobs time-sequentially. NIC takes out the print jobs on the server machine job by each job and transfers each print job to a printer controller. the printer controller executes each of the print jobs. the printer controller generates an appropriate message according to whether a print job has been completed or interrupted. NIC transfers a message to the server machine. the server machine transfers the message to the corresponding client machine. and the client machine automatically displays contents of the message.

20 Claims, 10 Drawing Sheets

METHOD OF REPORTING RESULT OF EXECUTION OF PRINT JOB IN NETWORK SYSTEM, METHOD OF SETTING SCANNING CONDITIONS IN NETWORK SYSTEM, AND NETWORK PRINTING/ SCANNING SYSTEM

FIELD OF THE INVENTION

The present invention relates to a method of reporting a result of execution of a print job in a network system, a method of setting scanning conditions in the network system, and a network printing/scanning system in which the convenience of use in a case of printing/scanning each job by using a printer, a scanner, or a copier or the like through a network can be improved.

BACKGROUND OF THE INVENTION

In recent years, there has been a growing use of various types of network system in ordinary offices in association with technological improvement in computer or various types of image processing, upgrading of network environments, and development of communication technology or the like.

FIG. 10 shows general configuration of a network printing system in an example of a network system based on the conventional technology, and the network printing system comprises a printer 1001 as a printing device for outputting an image to a recording paper; a network interface controller (described NIC hereinafter) 1003 for connecting the printer 1001 to a network 1002; a printer controller 1004 for converting a print data stream received thereby through the NIC 1003 to printable image data, outputting the data to the printer 1001, and also controlling the printer 1001; a plurality of work stations (described WS hereinafter) 1005 as client machines each connected to the network 1002; and a printer server 1006 as a server machine for organically connecting the printer 1001 and printer controller 1004 to the plurality of WSs 1005 through the network 1002 and the NIC 1003, and providing various types of service.

In the configuration described above, the network printing system uses the printer 1001 as a shared resource through the plurality of WSs 1005 each provided on the network 1002. Namely, it is a shared type of system through a network. For instance, in a case where printing is required in one of the WSs 1005, a user, at first, specifies a document to be printed and a file of image data or the like, and sets printing conditions such as a number of printed sheets of paper or the like on the WS 1005, then generates a print job.

Then, when the print job is transferred to a printer server 1006 through the network 1002, the print job is time-sequentially queued by a print queue function of the printer server 1006. It should be noted that the printer server 1006 queues the print jobs received thereby from the plurality of WSs 1005 in the received order (time sequence).

The printer server 1006 transfers the print job time-sequentially queued by the print queue function to the printer controller 1004 through the network 1002 and NIC 1003 in a specified order, and also outputs a message (a print-completion report) indicating the end of printing of the transferred print job to the corresponding WS 1005.

The printer controller 1004 converts, when a print job is received thereby, a print data stream among the received print jobs to printable image data, outputs the data to the printer 1001, and controls the printer 1001, and then an image is formed on a recording paper.

As described above, in the network printing system based on the conventional technology, a print job outputted from each WS 1005 is inputted once into the printer server 1006, and is time-sequentially administrated by the print queue function, so that the printer 1001 can be used by being shared with a plurality of WSs 1005.

The system based on the conventional technology also provides a network printing system in which a copier is connected to the network in place of the printer 1001 described above and the system is based on the copier.

However, with the network printing system based on the conventional technology, although the printer can be used by being shared with a plurality of WSs with the print queue function of the printer server, the print job is transferred to the controller, and at the same time a message indicating that printing of the corresponding print job has been finished (a report related to end of printing) is issued to the WS, so that, in other words, the point of time when a user receives the print-completion report through the WS does not mean the fact that the printing has actually been completed, so that, in a case where the print job has a large amount of data, when a user arrives at the printer to fetch recording paper on which the data is supposed to have been printed, the user sometimes finds that the printing has not been completed yet, then the user has to wait until the printing is completed, which causes the workability of the user to become lower, or in a case where the printing is suspended due to generation of paper jam or paper out in the printer, when a user arrives at the printer to fetch recording paper on which the data is supposed to have been printed, the user sometimes finds that the printing has not been completed yet. Namely, the print-completion report does not play its original role, which causes a user to become confused and is not good to the user.

With the network printing system based on the conventional technology, the printer server outputs the message (print-completion report) to the WS not according to an operating state of the printer controller or of the printer, so that, for instance, in a case where a paper jam or a shortage of paper is generated in the printer, the system can not output the correct message to the WS.

As one of network systems, a network scanning system in which a scanner is used by being shared with other WSs through a network is conceivable, but in the network system based on the conventional technology, a function for improving the convenience of work to input therein image data from the scanner through the network is not particularly provided.

Furthermore, in a network printing/scanning system with a copier connected to the network in place of the printer or the scanner and with the copier as the base of the system, the same problems as those described above exist.

SUMMARY OF THE INVENTION

It is a first object of the present invention to generate a correct message according to whether a printer is in a state where a print job has been completed or in a state where a print job has been disabled for the some reason or other so that correct message can be reported to a user.

It is a second object of the present invention to provide a function in which the convenience of work and the workability in inputting therein image data from a scanner through a network are improved.

It is a third object of the present invention to provide a function in which, in a network printing/scanning system with the copier as the base of the system, a correct message is generated according to whether a printer is in a state where a print job has been completed or in a state where a print job has been disabled, the message is reported to a user, and furthermore the convenience of work and the workability in inputting therein image data from a copier through the network are improved.

The method of reporting a result of execution of a print job in a network system according to the present invention, comprises a first step in which the server machine receives the print job outputted from the plurality of client machines, time-sequentially queues the print job, generates a job ID corresponding to the print job, stores therein the generated job ID, a user ID of the print job, and a connection ID; a second step in which the network interface controller takes out the queued print job on the server machine by each job and transfers the job to the printer controller; a third step in which the printer controller stores a job ID of the print job received from the network interface controller, and carries out the print job; a fourth step in which the printer controller generates an appropriate message based on a state of completion of the print job or on a state of suspension thereof and returns the message together with the job ID to the network interface controller; a fifth step in which the network interface controller receives the message with the job ID included therein from the printer controller and transfers the received message to the server machine; a sixth step in which the server machine time-sequentially queues the message with the job ID included therein received from the printer controller through the network interface controller, checks the job ID of the queued message, specifies a job owner from a user ID and a connection ID corresponding to the job ID, and in a case where the specified job owner exists on the network, the server machine immediately transfers the message to the corresponding client machine; and a seventh step in which the client machine receives the message from the server machine and automatically displays contents of the message on a screen, so that an appropriate message is generated based on a state of completion of the print job or a state of suspension thereof in a printer, and the message can be reported to a user.

The method of setting scanning conditions in a network system according to the present invention comprises a first step in which the client machine generates a scanning profile for specifying scanning conditions such as a document size, reading conditions, and a title of an image file or the like; a second step in which the server machine receives the scan profile from the plurality of client machines, and maintains or stores them therein; a third step in which the server machine, in a case where a power for the scanner controller is started up and in a case where there is any addition to and change of the scanning profile, transfers all scan profiles to the scanner controller through the network interface controller; a fourth step in which the scanner controller receives all the scan profiles from the server machine, and maintains or stores them as copied scan profiles therein; a fifth step in which the scanner controller, in a case where a network scanner function is required through an operating panel of the scanner, displays a list of the copied scan profiles on the operating panel, and makes the scanner select a desired scanning profile; a sixth step in which the scanner controller displays the contents of the selected scan profile on the operating panel, and asks a user to identify it; and a seventh step in which the scanner controller controls the scanner to start a scanning operation according to a start switch being pressed on the operating panel, so that it is possible to provide functions in which the convenience of work for receiving image data from a scanner through a network and the workability thereof can be improved.

In the network printing/scanning system according to the present invention, the server machine comprises a print queue function for time-sequentially queuing print jobs each outputted from the plurality of client machines; a job ID generating function for generating job IDs corresponding to the print jobs; an ID storage function for storing the generated job IDs, user IDs of the print jobs, and connection IDs; a message queue function for time-sequentially queuing messages with job IDs included therein received from the scanner/printer controller through the network interface controller; a job owner specifying function for checking the job ID in the queued message, and specifying a job owner from the user ID and connection ID corresponding to the job ID; a message send-out function for immediately sending out the message to the corresponding client machine in a case where the specified job owner exists on the network; and a deleting function for deleting the message, job ID, user ID, and connection ID after the message is transferred, the network interface controller comprises a print job transferring function for taking out one of the print jobs queued on the server machine by each job, and transferring the job to the scanner/printer controller; and a message transferring function for receiving the message with a job ID included therein from the scanner/printer controller, and transferring the message to the server machine, the scanner/printer controller comprises a print-job executing function for storing the job ID of the print job received from the network interface controller, and also executing the print job; a message generating/returning function for generating an appropriate message and returning the message with the job ID to the network interface controller respectively in a case where the print job is successfully completed or in a case where it is suspended due to some error, the client machine comprises a message displaying function for automatically displaying the contents of a message on a screen in a case where it has received the message from the server machine, so that, in the network printing/scanning system with a copier as a base, an appropriate message is generated based on a state of completion of the print job or a state of suspension thereof in a printer, and the message can be reported to a user, and furthermore it is possible to provide functions in which the convenience of work for receiving image data from a copier through a network and the workability thereof can be improved.

Other objects and features of this invention will become understood from the following description with reference to the accompanying drawings.

DESCRIPTION OF THE PREFERRED EMBODIMENT

Detailed description is made hereinafter for a method for reporting a result of execution of a print job in the network system, a method for setting scanning conditions therein, and a network printing/scanning system according to the present invention, by using a network printing/scanning system with a copier comprising a scanner and a printer as a base of the system as an example in the order of:

[1] configuration of the system according to the present embodiment;

[2] a function in each section constituting the system;

[3] configuration of software and hardware of the digital copier system;

[4] data processing flow of the scanner/printer controller;

[5] network operation;

[6] network printer function according to the present embodiment;

[7] network printer function according to the present embodiment;

[8] status query function according to the present embodiment; and

[9] a printer driver, a scanner driver, and utility with reference to the related drawings.

[1] Configuration of the System according to the Present Embodiment

The network printing/scanning system according to the present invention comprises a plurality of client machines, a digital copier system, and a network OS required by an LAN (local area network) system to be used.

There are various types of network OS such as one requiring a file server machine, or one with one unit of client machine incorporating therein both of a server function and a client function or the like. The network OS is not particularly described herein. The following description for general configuration according to the present invention assumes a case where there is a physical LAN system, a certain network OS is incorporated therein, and a given client machine and the digital copier system can make interactive communication with each other through the server machine (including therein server software operated on the machine) by making use of the system described above.

Figure 1:
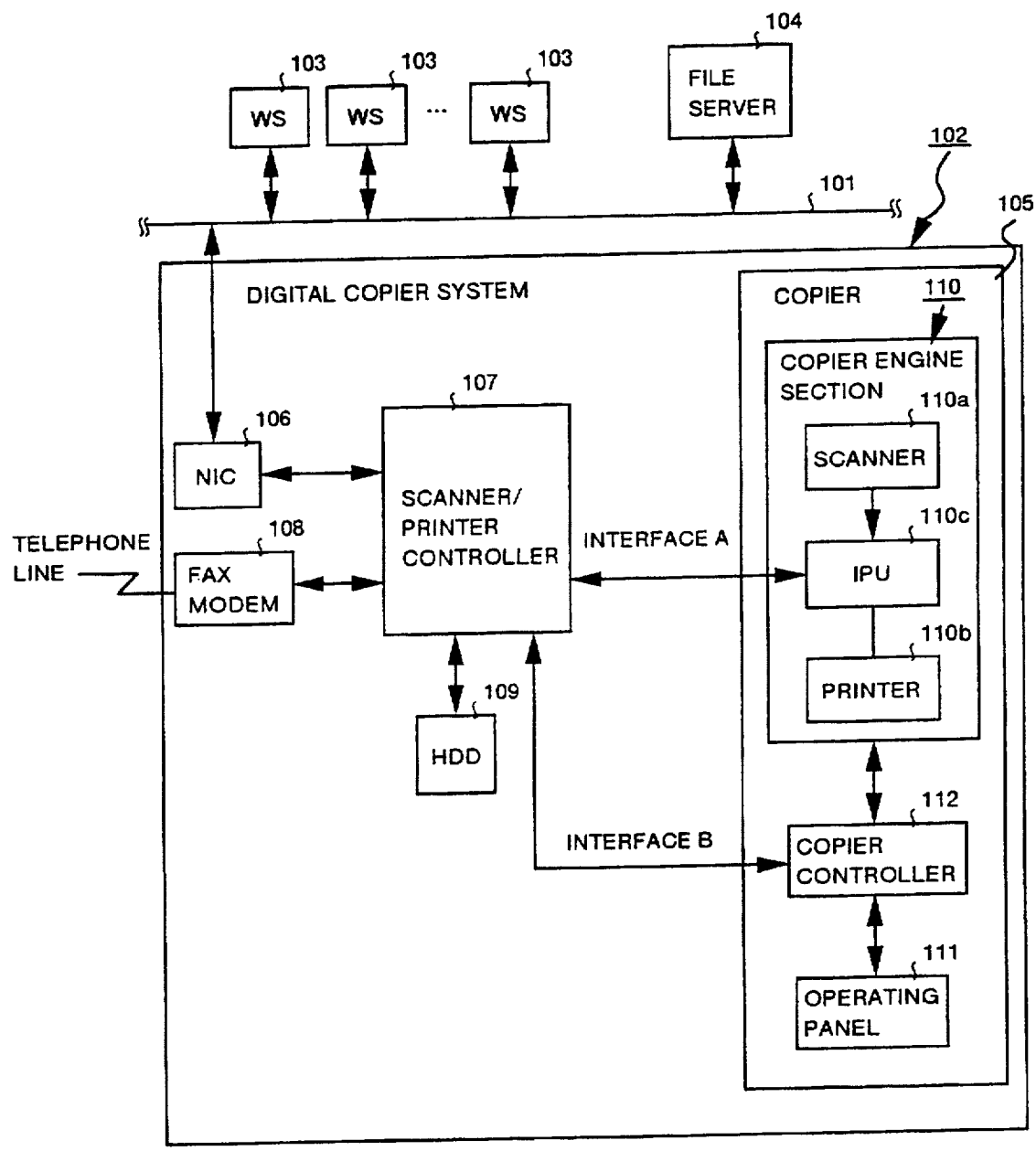
FIG. 1 is a block diagram schematically showing hardware of the network printing/scanning system according to the present embodiment.

FIG. 1 schematically shows configuration of hardware in the network printing/scanning system according to the embodiment, and the system roughly comprises a network-compatible digital copier system 102 connected to a network 101, a plurality of work stations (described as WS hereinafter) 103 as client machines each connected to the network 101, and a file server 104 for organically connecting the digital copier system to the plurality of WSs 103 through the network 101 and providing various types of service.

The digital copy system 102 comprises a copier 105 including therein a scanner 105a and a printer 105b; a network interface controller (described as NIC hereinafter) 106 for connecting the copier 105 to the network 101; a scanner/printer controller 107 for converting a print data stream received thereby through NIC 106 to printable image data, outputting it to the copier 105, and controlling the copier 105; a FAX (facsimile) modem 108 connected to a telephone line; and a HDD (hard disk drive) 109 connected to the scanner/printer controller 107.

It should be noted that the copier 105 is a complete copier by itself, and comprises a copier engine section 110 comprising a scanner 110a with an ARDF (Auto-Reverse Document Feeder), a printer 110b with various types of paper handling (a paper-feeder tray, a double-sided device, a paper-discharging device), and an IPU (Image processing unit; an image processing section) 110c for subjecting video data read by the scanner 110a or video data received thereby from the scanner/printer controller 107 to various types of image processing; an operating panel 111 with a touch panel incorporated therein; and a copier controller 112 for controlling the copier engine section 110 and controlling an input-output of the operating panel 111.

The operating panel 111 comprises, for instance, a 400× 640 dot LCD display section, and a touch panel divided into 16×16 areas, and enables set of a copier function, a printer function, and a scanner function by using functions of the display section and the touch panel interacting with a use. Furthermore a status message required by the scanner/printer function can be displayed in the panel.

It should be noted that control of the copier engine section 110 by the copier controller 112 includes controls such as checking the configuration of the copier engine section 110 to determine what type of option is added thereto; checking a state of each paper-feeder tray, a state of the double-sided device, a state of the paper-discharging device, and a state of the ARDF; setting a paper path in each section described above; further, starting up the operation of the scanner 110a and printer 110b; checking how the process is preceding; and checking a situation with detail when any error occurs.

The scanner/printer controller 107 and the copier 105 are connected to each other, as shown in the figure, through a video interface (interface A) for inputting thereto image data read by the scanner 110a and outputting the image data to the printer 110b as well as through a command/response interface (interface B) for instructing an operation of the scanner/printer, checking the state thereof, and communicating with the operating panel 111.

The scanner/printer controller 107 is connected to the network 101 through the NIC 106, and a data stream of printer, commands of operating and editing the scanner, and read-out image data are transferred thereinto.

Furthermore, the scanner/printer controller 107 is connected to an external telephone line through the FAX modem 108, and recovers the received FAX data, converts the resolution of the data to that required for the printer 110b if necessary, temporarily stores the resolution as print data in a page buffer memory (not shown herein), and then outputs the data to the copier 105. Also in a case of the FAX-send, and if an instruction for the FAX-send and a telephone number for destination of sending are added to the print data when the data is sent from the host (WS 103), the FAX-send is executed. In this step, if a receiver in the destination of the sending receives the same print data (however, the data is not a bit image herein, but print data expressed in a printer language), the scanner/printer controller transfers the data in a data stream as it is through the FAX modem 108. On the other hand, if a receiver is an ordinary FAX receiver, the controller converts the data to a FAX-send image, further subjects the data to required data compression, and transfers the data through the FAX modem 108. It should be noted that the FAX function is not described further more in the present system.

The scanner/printer controller 107, not shown herein, has an ordinary parallel and serial interfaces each as a printer connecting interface, and has a SCSI-2 interface as a scanner connecting interface. Accordingly, the scanner/printer controller can be used as a printer and a scanner generally connected one to one. The interface connected one to one is not described any further herein. All input-output data for the scanner and printer is to be executed through the network 101 hereinafter.

The scanner/printer controller 107 has functions for input-output of the printer and for input-output by the scanner with a page buffer memory provided at a center thereof. Herein, brief description is made for general contents of the input-output operations of the printer, and also for general contents of local input operations by the scanner.

In input-output operations of the printer, print data transferred from a WS 103 to the scanner/printer controller 107 is data corresponding to the printer language supported by the scanner/printer controller 107. The printer language includes, for instance, a postscript, and a PCL or the like. The scanner/printer controller 107 can be used for one supporting a single printer language, or one supporting a plurality of printer languages or the like. Also, which printer language is to be used for printing is previously specified from a WS 103 with the command, set immediately before the copier 105 is used with the operating panel 111, or decided by automatically determining in which printer language the data is written in the scanner/printer controller 107 and automatically switching to the operating mode for the language.

The scanner/printer controller 107 converts print data (a print data stream) received thereby from a WS 103 to generates image data in the page buffer memory by one page, and outputs raster data by one page to the copier engine section 110.

A local input by the scanner is carried out in the operational sequence of input (in the order of operations) as follows:

(1) A scan profile (the detail is described later) previously generated and registered in a WS 103 is selected with the operating panel 111.

(2) A document to be read is set on a base for reading in the scan 110a.

(3) The document is started to be scanned by pressing a start key on the operating panel 111.

(4) The scanned data is subjected to direct image data compression page by page, and the data is stored in the page buffer memory of the scanner/printer controller 107.

(5) If there is a capacity in the page buffer memory to accumulate data of the document for next one page, scanning is continuously carried out. If the capacity of the page buffer memory is insufficient, scanning is interrupted until the data is shifted to the HDD 109 as a local hard disk connected to the scanner/printer controller 107.

(6) In a case where there are a plurality of scanned pages, page numbers are automatically assigned to titles of files in ascending order for filing.

(7) The compressed data is temporarily accumulated in the HDD 109, is subjected to decompression again on the page buffer memory, is converted to a specified TIFF, and is accumulated in an external file server 104 by one job.

The above description is for operations of transferring image data in the operation of the scanner. Accordingly, the transferred image data is read out by a user on a WS 103, and is used for some purpose. Writing is completely separated from reading with a file as an interface.

In the operations, when it is written into the HDD 109, the image data is compressed in order to improve memory efficiency and to improve a speed for storing the data. When it is also transferred from the HDD 109 to the file server 104, the image data is possibly subjected to compression to reduce a quantity of data, but a system of compressing image data when the data is stored in the secondary memory is not necessarily identical to that when the data is transferred to a WS 103, and each case can employ discrete system respectively. Each of the cases should employ a compression system convenient thereto respectively. In the embodiment, the TIFF system is employed for an image file (image data) transferred from the scanner/printer controller 107 to the file server 104.

When all the document has completely been read, a user takes the document away from the copier and returns to the WS 103 with the document at which the user is working, and the copier 105 is released to another user. Accordingly, there is no such a case where a user occupies the scanner until whole scanning operations are completed like that in the scanner based on the conventional technology.

Next, brief description is made for outputting operations (a sequence of operations) by a user in a WS 103.

(1) A user accesses an image file read in from the file server 104 by using utility software from a WS 103. It is possible to upload the whole image data as an image file without converting it and as it is, but it is required at least in the file server 104 to match the data with the transferring format required by the utility software for the WS 103. In the embodiment, any conversion is not required because the TIFF system is used.

(2) In a case where the image file in the file server 104 is shifted to a WS 103, there are two methods of a COPY function and of a MOVE function. The COPY function transfers the image file to a WS 103 with an original image file left in the file server 104. The MOVE function deletes the image file in the file server 104 immediately after the image file has correctly been transferred to the WS 103.

(3) The image file shifted to the WS 103 is incorporated in commercial application software compatible to handle images marketed, and the final object can be achieved.

[2] Functions of Each Section Constituting the System

Next description is made for functions of each section (a network 101, a digital copier system 102, a WS 103, and a file server 104) each constituting the system.

The file server 104 (the server machine according to the present invention) has functions as indicated in Table 1 and Table 2 each described below.

TABLE 1

| Functions | Contents of the functions |
|---|---|
| Print queues function | A print job outputted from a plurality of WSs 103 is time-sequentially queued. |
| Job ID generating function | A job ID is generated in response to the print job. |
| Job ID storage function | A user ID and a connection ID for the print job are stored. |
| Message queue function | A message including therein the job ID received from the scanner/printer controller 107 through the NIC 106 is time-sequentially queued. |
| Job owner identifying function | The job ID of the queued message is checked, and a job owner is identified from the user ID and the connection ID each corresponding to the job ID. |
| Message send-out function | In a case where the identified job owner exists on the network, the message is immediately sent out to the corresponding client machine. |

TABLE 1-continued

| Functions | Contents of the functions |
|---|---|
| Deleting function | After the message is transferred, the corresponding message, job ID, user ID and connection ID are deleted. |
| Message processing terminating function | If the job owner identified by the job owner specifying function does not exist on the network 101 due to a log out or a power being turned OFF, the corresponding message is aborted and the processing is terminated. |
| Message queue function | If the job owner identified by the job owner specifying function does not exist on the network 101 due to a log out or a power being turned OFF, the corresponding message is maintained or stored in the message queue, and whether the identified job owner is logged in again or not is periodically checked, and when the log-in is checked, the message maintained or stored is immediately transferred. |
| Print profile maintaining function | Print profiles each for specifying printing conditions such as a paper pass, and a finishing or the like are maintained or stored in a plurality of files. |

TABLE 2

| Functions | Contents of the functions |
|---|---|
| User ID storage function | A user ID of an owner of each print profile is stored for each print profile. |
| Print profile linking function | When the print job queued by the print queue function is transferred to the network interface controller, whether the print profile is maintained or not is checked by the user ID identical to the corresponding print job, and in a case where the print profile of the identical user ID exists thereon, the print profile corresponding to the header of print jobs is connected thereto, and a determination flag indicating their connection is set. |
| Scan profile maintaining function | A plurality of files of scan profile for specifying scanning conditions such as a document size, and reading conditions or the like are maintained or stored. |
| Scan profile transferring function (1), or | In a case where power for the scanner/printer controller 107 is started up and in a case where there is some data added to or modified in the scan profile maintained or stored in the scan profile maintaining function, the whole scan profile is transferred to the scan/printer controller 107 through the NIC 106. |
| Scan profile transferring function (2) | A list of the whole scan profile is transferred in a case where the list thereof is required to be transferred by the scanner/printer controller 107, and in a case where a particular scan profile is required to be transferred, the corresponding scan profile is transferred. |
| Scan image file storage function | The scan image file transferred from the scanner/printer controller 107 thereto through the NIC 106 is stored according to the prespecified file system. |
| Maintaining function | Necessity or unnecessity data added to the print job is maintained or stored. |
| Message aborting function | In a case where the message is not required, a message is stopped to be send out to a job owner by the message send- out function, and the message is aborted. |

The NIC 106 (the network interface controller according to the present invention) has the functions shown in Table 3 described below.

TABLE 3

| Functions | Contents of the functions |
|---|---|
| Print job transferring function | A print job queued on the file server 104 is taken out by each job, and is transferred to the scanner/printer controller 107. |
| Message transferring function | A message including therein the job ID is received from the scanner/printer controller 107, and is transferred to the file server 104. |

The scanner/printer controller 107 (the scanner/printer controller in the digital copier system according to the present invention) has the functions shown in Table 4 and Table 5 described below.

TABLE 4

| Functions | Contents of the functions |
|---|---|
| Print job executing function | A job ID for a print job received from the NIC 106 is stored, and the print job is executed. |
| Message generating /returning function | In a case where the print job is successfully completed and in a case where the job is suspended due to some error, an appropriate message is generated for each case, and is returned to the NIC 106 together with the job ID. |
| Command override function | Whether any print profile is linked to the print job received from the NIC 106 or not is checked, and in a case where the print profile is linked thereto, a command related to the paper handling included in the print job is replaced for a command related to the identical paper handling included in the print profile. |
| Copied scan profile maintaining function | The whole scan profile transferred from the file server 104 is maintained or stored as a copied scan profile. |
| List selecting function (1), or | In a case where a network scanner function is requested from the operating panel in the copier 105, a list of copied scan profiles is displayed on the operating panel 111, and a desired scan profile is selected. |
| List selecting function (2) | In a case where a network scanner function is requested from the operating panel in the copier 105, a request for transferring the whole scan profiles is outputted to the file server 104, and the list of the whole scan profiles transferred from the server machine is displayed on the operating panel 111, and a desired scan profile is selected. |
| Scan profile identifying function | The contents of the scan profile selected by the list selecting function is made to be displayed on the operating panel 111, so that a user can identify it. |
| Scan operation starting function | A scan operation is started by controlling the copier 105 when a start switch on the operating panel 111 is pressed. |
| Scan image data accumulating function | Scan image data read out by the copier 105 is temporarily accumulated. |

TABLE 5

| Functions | Contents of the functions |
|---|---|
| Scan image file transferring function | After scanning operations of the whole document are finished, the whole scan image data is converted to a specified format, and is transferred to the file server 104 as a scan image file. |

TABLE 5-continued

| Functions | Contents of the functions |
|---|---|
| Title displaying function | At a point of time when the scanning operation are finished, a title of the scan image data accumulated by the scan image data accumulated function is displayed on the operating panel. |
| Page number displaying function | In a case where a multi-document is scanned by using an ADRF, a page number at which the scan is finished is displayed at each time. |
| Error displaying function | In a case where any error is generated during scanning, the contents of the error is displayed thereon. |
| Rescannig commanding function | In a case where an error is one allowing continuation of scanning, a required page number is displayed, and a message commanding for scanning it again from the corresponding page is displayed on the operating panel 111. |
| Scan image data deleting function | In a case where an error is one disabling continuation of scanning, the scan image data temporarily accumulated therein until then is automatically deleted. |

The WS 103 (the client machine according to the present invention) has the functions shown in Table 6 described below.

TABLE 6

| Functions | Contents of the functions |
|---|---|
| Message displaying function | In a case where any message is received from the file server 104, the contents of the message is automatically displayed on the screen. |
| Necessity/unnecessity data adding function | When a print job is outputted to the file server 104, necessity/unnecessity data whether a message at the time of completion/suspension of the corresponding print job is required or not is added to the job. |
| Print profile reregistering function | Contents of the print profile maintained or stored on the filer server 104 is edited, modified and reregistered. |
| Scan profile reregistering function | Contents of the scan profile maintained or stored on the filer server 104 is edited, modified and reregistered. |
| Scan image file reading function | The scan image file stored by the scan image file storage function in the file server 104 is read, and is handled as an ordinary image file. |

[3] Configuration of Software and Hardware in the Digital Copier System

Figure 2:
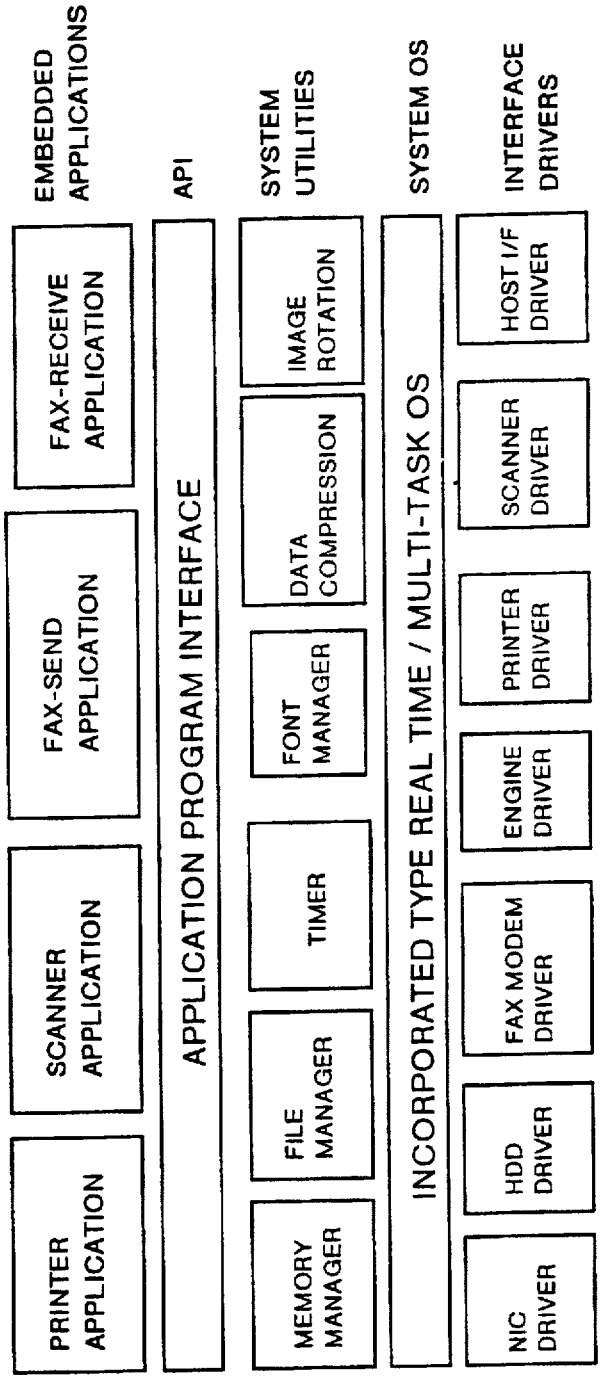
FIG. 2 is an explanatory view showing general configuration of software of the digital copier system according to the present embodiment.

FIG. 2 shows general configuration of the software in the digital copier system according to the present invention, and a group of the software (Interface Drivers) called as drivers each for driving an hardware interface is provided in the lowest layers. These drivers are controlled by the incorporated type real time/multi-task OS (System OS), and schedule a plurality of tasks each irregularly generated without delaying them and make them execute.

Provided on the incorporated type of OS are a group of manager software for efficiently using common hardware assets such as a memory and a timer or the like, and a group of system utility software commonly usable for each application.

Interfaces for a group of drivers, a group of managers, and a group of utilities are prepared for embedded applications, and these groups are used by the embedded applications such as print/scanner/FAX-send/FAX-receive or the like.

A NIC driver, a HDD driver, a FAX modem driver, a host driver exchange data with the NIC 106, HDD 109, FAX modem 108 and the applications or the utilities respectively, and the host driver includes therein a parallel/serial interface for a printer and a SCSI for a scanner, and data is exchanged between the machines and the host.

An engine driver exchanges a status with the copier engine section 110, sets paper handling, starts up the printer/scanner, and makes communications with the operating panel 111.

A printer driver controls an input-output of printer video data (setting of DMA, and setting of smoothing or the like), and a scanner driver controls an input of scanner video data (setting of DMA, setting of a data compression system, setting of a scan mode or the like).

A memory manager manages a RAM and efficiently makes use of the limited memory by dynamically allocating a memory to each task or an application by providing one unit of physical memory or by releasing it according to a request from each task or an application.

A file manager efficiently manages the HDD 109 as a secondary memory, and is software for managing a file list, registering and deleting a title of a file, and provides a linked control between the list and an actual stored area.

A timer can be used by each task and applications by being shared therewith, and a right of using the timer is transferred to another task if necessary.

A font manager provides font data required by each printer language according to the request therefrom.

Data compression and image rotation or the like are also a group of software each usable when images are processed by the scanner, printer, FAX-send, and FAX-receive by being shared therewith, and in addition to the software described above, there are various types of group of software which can be used by being shared therewith, but description thereof is omitted herein.

Figure 3:
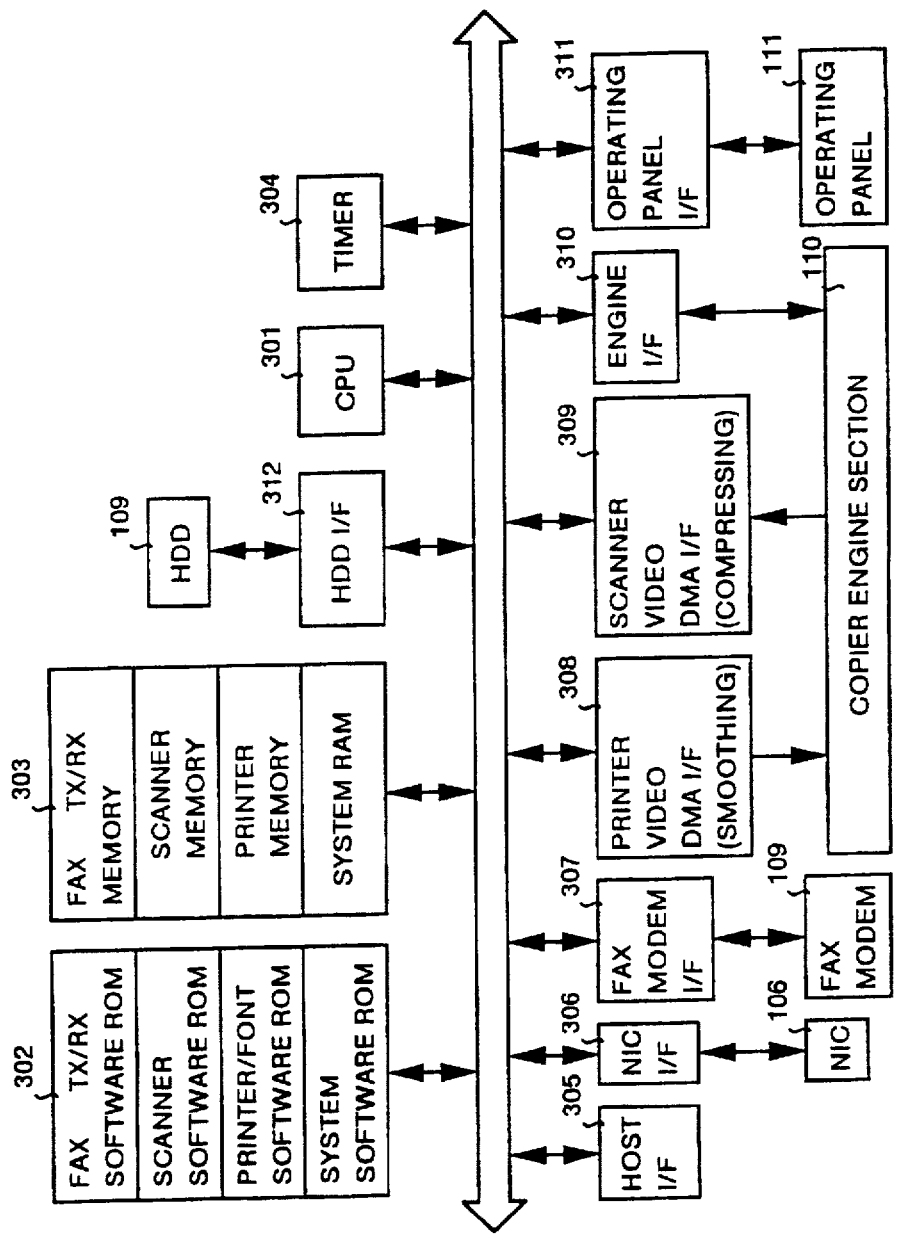
FIG. 3 is an explanatory view showing general configuration of hardware of the digital copier system according to the present embodiment.

FIG. 3 shows general configuration of hardware in the digital copier system according to the embodiment, which is ordinary configuration thereof, and the configuration comprises a CPU 301, a ROM 302, a RAM 303, and a timer 304, and furthermore comprises, as physical interfaces, a host I/F 305, a NIC I/F 306, a FAX modem I/F 307, an engine I/F 310, an operating panel I/F 311 and a HDD I/F 312, a printer video DMA I/F 308 as a portion of controlling an input-output of a video signal for the printer/scanner, and a scanner video DMA I/F 309 or the like.

A video signal for the printer/scanner is inputted and outputted at high speed, a direct signal to and input/output from a memory with the DMA, and control for smoothing (technology of improvement in an image) on outputting an image from the printer and data compression or the like on inputting thereinto an image by the scanner are executed by hardware-processing (the printer video DMA I/F 308 and scanner video DMA I/F 309) with an ASIC/LSI or the like.

The RAM 303 has extendable configuration, and, physically is one unit of continuous memory, but, logically, is used for various purposes under control by the memory manager. Each application or utility software obtain a memory capacity required for the software by requesting it to the memory manager and starts the operations. In a case where a sufficient capacity of memory can not be obtained, the RAM has to wait until the memory can be obtained because the operation can not be carried out without it. For instance, in a case where the scanner is requested during operation of the printer, both functions can run when a memory capacity becomes sufficient therein, but in a case where the capacity is insufficient therein, the scanner function has to stand by until the printer function is completed.

A required program is stored in the ROM 302, but the program may be stored in the HDD 109. In this case, only a program for loading a required program from the HDD 109 may be stored in the ROM 302. The loaded program operates on the RAM 303.

Programs each provided onto the ROM 302 or the HDD 109 are modularized for each application software, and, for instance, if the scanner service software described above (scanner application software) is separated from the others by each ROM module or by each load unit to the HDD 109, the scanner function can be made optional, so that the scanner service software can be provided only to a user requiring that software, and for this reason, the costs loaded to a user not requiring the scanner function can be avoided.

[4] A Data Processing Flow of the Scanner/Printer Controller

Figure 4:
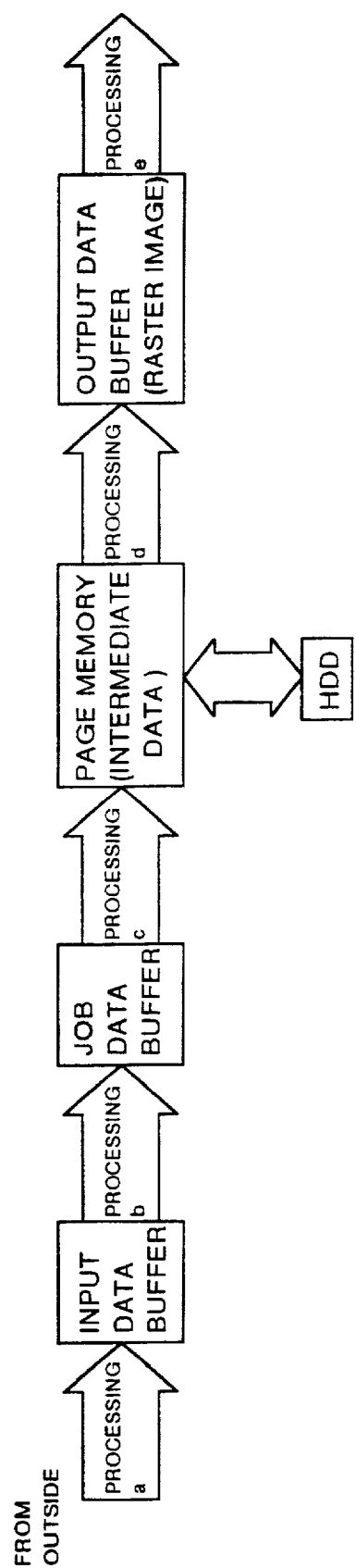
FIG. 4 is an explanatory view showing a data processing flow of the scanner/printer controller according to the present embodiment.

Next, a description is made for a data processing flow of the scanner/printer controller 107. Generally, print data is printed onto recording paper finally as raster data while the data varies its form in the controller. The data form is modified in memory-to-memory (data delivery between memories), and becomes the flow as shown in FIG. 4. In the figure, the sequence from processing a to processing e indicates a processing of modification executed between memories.

The more detailed contents of the sequence from processing a to processing e is as described below.

Processing a: to synthesize data streams transferred from outside in a non-synchronous sending by using an input data buffer.

Processing b: to divide the data stream into job units and to store them in the job data buffer. A job unit indicates a unit of printer language (ex: PCL, 5/PS2), or a user.

Processing c: to convert each job to intermediate data (a display list) by each page. The data is secondary arrangement data including therein data for an actual page layout, data for fonts, and data for a paper size.

Processing d: To fix the intermediate data by each page, and to mechanically convert the data to a raster image.

Processing e: To synchronize a frame of the raster image to that of the copier engine section 110, and to output the image as video data.

Also, a control for stacking pages with face up in the decreasing page number, and control for jumping pages for duplex printing are saved in the HDD in a form of intermediate data, and the controls are carried out by searching pages in the required order of pages.

It should be noted that, generally, a data form when page data (intermediate data) is saved in the HDD includes the three types as described below, and the data is saved as intermediate data or raster data for controls for stacking pages in the descending order and for jumping pages.

(1) Saving as a job data file

There are many cases where one unit of job comprises a plurality of pages. Generally, conditions specified in the previous page (e.g. specifying a font, or a page-format, or the like) are succeeded and influence is effected to the following pages in many cases. Accordingly, this type of method can not be employed because the order of pages in each job can not be controlled. (2) Saving as an intermediate data (display list) file Data can be saved by each page, so that the order of pages can be controlled. The advantage thereof is that a quantity of data in this saving mode is generally small. A quantity of data does not depend on its resolution. Also the disadvantage thereof is that a long period of time is required for converting the data to final raster data. A download font or the like may be lost during the job. (3) Saving as a raster data file Data can be saved by each page, so that the order of pages can be controlled. The advantage thereof is that a time required for post processing is unnecessary because the data has already been converted to raster data. The data is accurately controlled because the data is in the final form. Also the disadvantage thereof is that a quantity of data is large. A quantity of data depends on its resolution.

Whether the data is saved in the HDD as intermediate data or raster data is a matter for option, but it should be saved as intermediate data having a small quantity of data in consideration of a data transfer rate for input to and output from the HDD. A long period of time required for input to and output from the HDD becomes a bottle neck, and the printing performance is largely affected thereby.

Assuming that, in a standard text (average of 5K-byte/page) for performance regulation, 40 byte/letter are added thereto, 200K-byte/page is required for the intermediate data. Assuming that 100 pages are prepared for a spoolar for a control of pages for stacking in the descending order and control for jumping over pages, the capacity of 20M-bytes is required for the HDD. In a case where multi-function machine comprises the digital copier system 102, a large memory capacity (HDD) is included therein. It is preferable to previously estimate how much capacity of HDD is required. Memory space allocation to each job as shown in Table 7 is considered to be enough for a general purpose.

TABLE 7

| Types of job | Capacity for an average page | Largest number of pages in storage | Largest required capacity |
|---|---|---|---|
| Print buffer | 200 K-byte /page | at least 500 pages | 20 MB |
| Font buffer | 200 K-byte /font | at least 500 fonts | 100 MB |
| G3-Fax-receive buffer | 100 K-byte /page | at least 500 pages | 50 MB |
| G3-Fax-send buffer | 100 K-byte /page | at least 500 pages | 50 MB |
| Scan buffer 1 | 400 K-byte /page | at least 500 pages | 200 MB |
| Scan buffer 2 | 3.2 M-byte /page | at least 60 pages | 200 MB |
| Others | — | — | |
| Total | — | — | |

(Note 1) An average compressibility of image data is ⅓.
(Note 2) Scan buffer-1 comprises one-bit data, and scan buffer-2 comprises 8-bit data.

[5] Network Operations

Next description is made for network operations.

A multi-function machine with the digital copier system 102 as a base, especially, a printer/scanner copier is a shared type of system product through a network. It is needless to say that the machine can be used as a one-to-one printer through an ordinary serial/parallel interface, and also as a one-to-one scanner through a SCSI, but a driver/utility each used through the network are more important.

A network in the network printing/scanning system according to the embodiment supports NetWare of Novell Co. as a first preference. A protocol used herein for network communications supports IPX/SPX of NetWare, TCP/IP of Unix, and Apple talk of Apple Co., but description is made only to the environment of NetWare for simplifying description therein.

Services provided as network solution in the system are provided through MFSA. NL (Multi-function Service Agent) operating on NetWare, and driver/utility software used in a client side communicating therewith. The provided services are described as follows:

(1) Network printing system (MFSA. NLM/Printer)
   Message for a print-completion report
   Print profile handling (identification and selection)
   Print queue handling (identification and selection)
(2) Network scanning system (MFSA. NLM/Scanner)
   Scanner profile handling
   Scanner image file handling
(3) Network query function
   Printer status
   Scanner status It should be noted that, the MFSA. NLM/Printer and MFSA. NLM/Scanner should be separated from each other in a form. For instance, by including the MFSA. NLM/Printer in a NIC option kit and including the MFSA. NLM/Scanner in a scan option kit, these services can be provided to clients as different options respectively.

It should be noted that the Network Query function is operated discretely from the MFSA. NLM, and the software, printer, and NIC in a client side each are directly communicated thereto for the execution.

[6] Network Printer Function in the Present Embodiment

The network printing/scanning system according to the embodiment provides two types of service function of (1) a print-completion report and (2) definition of a print profile as characteristics of the network printer function.

Herein, the service function of the print-completion report provides a message for a print-completion report to a client (WS 103) when output of the printed data has actually been completed after the printing is requested. And the service function also provides in addition to the service described above a service for sending out an appropriate message when printing is suspended due to paper jam or paper out.

As for the other service function of definition of a print profile, the paper path and paper handling (e.g. specifying an output bin, specifying staple or the like) each specific to the system according to the present invention can be defined by a print job profile. When a user carries out printing for itself, and by specifying a particular paper path or paper handling, the user can make the printer execute the print job as the user wishes even without using printer driver specific to the system.

Figure 5:
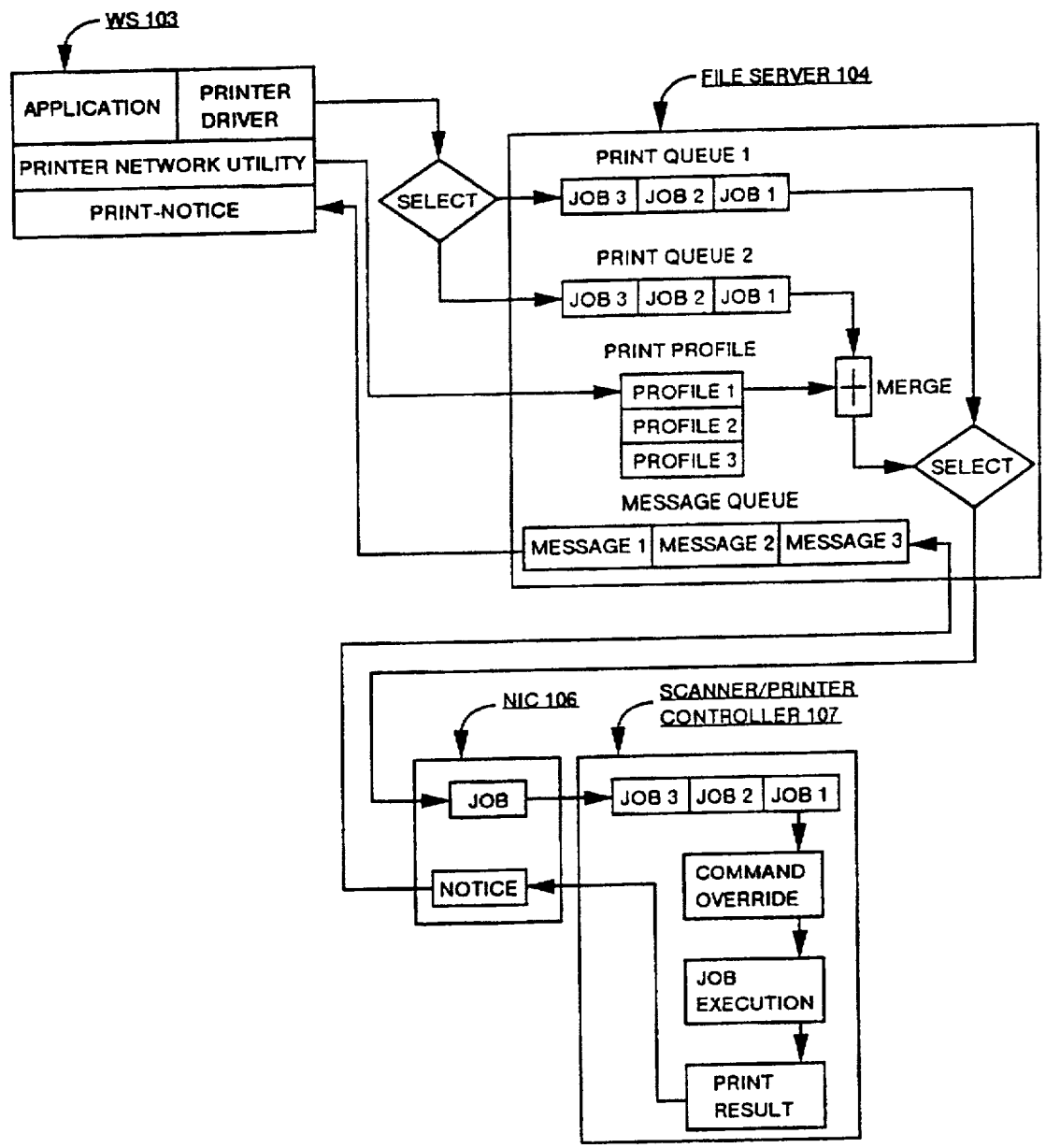
FIG. 5 is an explanatory view showing an operation and a job flow of the network printing in the NetWare environment.

FIG. 5 is an explanatory view showing an operation of network printing and a job flow in the NetWare environment.

Incorporated in the WS 103 side are a plurality of software of a printer driver, printer network utility, and a print-notice.

Incorporated in the file server 104 are a print queue server (the same as the existing one), a print profile, a message queue, and the MFSA. NLM for controlling those described above.

Incorporated in the NIC 106 in the digital copier system 102 are print server software for taking out a print job from the print queue, and software for returning a print-notice (a result of execution of printing).

Incorporated in the scanner/printer controller 107 are software for queuing a print job, software for executing printing, and software for generating a message concerning a result of execution thereof and giving the message to the NIC 106.

Herein, further detailed description is made for (1) the print-completion report function with reference to FIG. 5. All print jobs generated in the printer driver in the WS 103 are transferred to a print queue of Novell/NetWare. A plurality of lines of the print queue of NetWare can be allocated to a unit of printer. In this step, at least one line of the queues is allocated as an ordinary print queue of NetWare, and another line thereof is allocated as a print queue for the MFSA. NLM/Printer. In a case where a print job is requested through the MFSA. NLM, a user can receive a message for a print-completion report when printing is actually completed.

Figure 6:
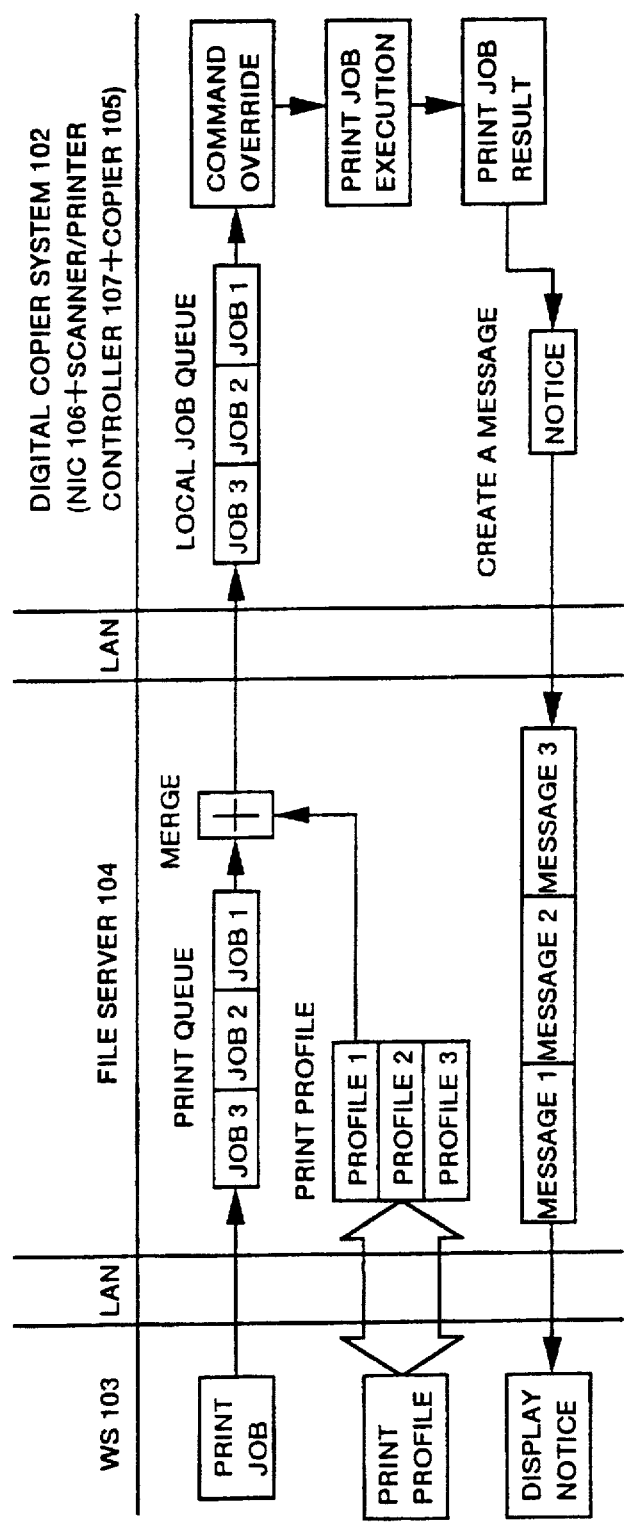
FIG. 6 is an explanatory view showing an operation flow for reporting completion of the printing.

Description is made for an operation flow in the print-completion report function with reference to FIG. 6. At first, a print job generated in the printer driver on a WS 103 is transferred to a print queue on the file server 104 through the network (LAN) 101. The print queue function queues print jobs transferred from a plurality of WSs 103 on the network 101 in the inputted order (namely, time-sequentially).

Then, PSERVER (software for inputting a print job) on the NIC 106 takes out a print job from the print queue on the file server 104 through the network 101, and transfers the print job taken out above to the scanner/printer controller 107.

The scanner/printer controller 107 accumulates the inputted print jobs in a local print queue of the scanner/printer controller 107.

Then, the scanner/printer controller 107 takes out a print job time-sequentially from the local print queue, transfers the job to the copier 105 and makes the copier 105 execute the print job.

After the step described above, the scanner/printer controller 107 generates the corresponding message when a printout is actually completed in the copier 105 or when the job is suspended due to paper jam or paper out or the like therein, and transfers the message to the NIC 106. The NIC 106 transfers the inputted message to the MFSA. NLM on the file server 104.

The MFSA. NLM of the file server 104 accumulates the message transferred from the NIC 106 in the message queue, then time-sequentially takes out the message, and delivers the message to an owner (WS 103) of the print job.

As described above, in the present system the scanner/printer controller 107 generates a message in accordance with a state of completion of the print job at a point of time when the print job has successfully been completed in the copier 105, and transfers the message to the corresponding WS 103 through the NIC 106 and the file server 104, so that an appropriate message is generated according to completion of the print job or to suspension thereof in the copier 105 (namely, the printer), and the message can be reported to a user.

On the other hand, in a case of an ordinary printing system of NetWare, a user can not receive a message when the printing is actually completed. Although a user can receive a print-completion report in the conventional type of NetWare, the report is nothing to do with whether the printing is actually completed or not because the file server 104 outputs a print-completion report at a point of time when the print job is transferred from the print queue on the file server 104 to the scanner/printer controller 107. Accordingly, even if the printing is suspended due to some trouble, a user could not receive the fact as a message. On the contrary, in the system according to the present embodiment as described above, a print-completion report is generated at a point of time when the printing is actually completed, and an appropriate message can be received when the job is suspended.

As for receiving of a message in a WS 103, for instance, there are some cases where it is troublesome for a user to receive a print-completion report (including therein a suspension report) for some reason, or a user considers that the current work should not be disturbed by anything even if the user requests a print job through the MFSA. NLM.

Accordingly, in the present embodiment, selection of whether a user receives a print-completion report or not can be specified by the user (WS 103). More specifically, a select switch for selecting necessity or unnecessity of a print-completion report may be provided in a print profile described later, or an item for selection of necessity or unnecessity thereof may be provided in the utility for print function, and said item may be used as a switch.

However, the scanner/printer controller 107 generates a message for a print-completion report or a print suspension report regardless of user's necessity or unnecessity, and always transfers the message to the NIC 106. And the NIC 106 always transfers the message to the MFSA. NLM of the file server 104. Herein, if the MFSA. NLM does not receive the message (due to e.g. a breakdown or the like), the NIC 106 repeats the operation for transferring it for a several times at a certain time interval. In a case where the message can not be transferred after repetition thereof for a specified number of times, the corresponding message is aborted.

As described above, the MFSA. NLM of the file server 104 accumulates the message from the scanner/printer controller 107 in the message queue, and returns the message to the user (WS 103) having requested the corresponding print job. In this step, in a case where the WS 103 does not require to receive the message of a print-completion report or a print suspension report, the corresponding message is aborted.

In a case where the user has already logged out, the MFSA. NLM temporarily stores the corresponding message, and in a case where the identical user logs on again, the message is immediately returned thereto. If the user having requested the job logs off and does not log on within a preset period of time, the MFSA. NLM automatically abort the message.

It should be noted that messages a) to d) described below are prepared as messages of print completion or print suspension.

a) Print completion with success
b) Print suspension with paper jam
c) Print suspension with paper out
d) Print suspension with some error Next detailed description is made for (2) definition of a print profile and the control sequence with reference to FIG. 5 and FIG. 6. A user generates a print profile for itself under both environments of Windows and DOS, and can register the profile to the MFSA. NLM. The print profile controls paper handling and a print job such as print-out finishing or the like.

At first a print job generated by the print driver on the WS 103 is transferred to a print queue on the file server 104 through the network (LAN) 101. The print queue queues print jobs transferred from a plurality of WSs 103 on the network 101 in the inputted order thereof (namely, time-sequentially).

On the other hand, a print profile prepared in the print network utility on the WS 103 is transferred to a print profile on the file server 104 through the network (LAN), and is stored and maintained in the MFSA. NLM.

Then, when PSERVER (software for inputting a print job) on the NIC 106 takes out a print job from the print queue on the file server 104 through the network 101, the MFSA. NLM checks whether the print profile of the user requesting the print job is registered or not, or requested or not.

The MFSA. NLM, in a case where the corresponding print profile exists and its use is requested, couples the file of the print job to the print profile. The print job+print profile obtained after the coupling is transferred to the NIC 106.

The NIC 106 transfers the print job including therein the print profile to the scanner/printer controller 107.

The scanner/printer controller 107 accumulates the inputted print jobs in a local print queue of the scanner/printer controller 107.

Then, the scanner/printer controller 107 takes out a print job time-sequentially from the local print queue, transfers the job to the copier 105 and makes it execute the print job. In this step, if the print profile is included in the job, the command in the print job is replaced for a command in the print profile (override).

After the step described above, the scanner/printer controller 107 generates the corresponding message when a printout is actually completed in the copier 105 or when the job is suspended due to paper jam or paper out or the like therein, and transfers the message to the NIC 106. The NIC 106 transfers the inputted message to the MFSA. NLM on the file server 104

The MFSA. NLM of the file server 104 accumulates the message transferred from the NIC 106 in the message queue, then time-sequentially takes out the message, and delivers the message to an owner (WS 103) of the print job.

As described above, in the system according to the embodiment, a print profile is prepared in the WS 103, and when the print profile is set to be used, the scanner/printer controller 107 overrides the old print profile to a new print profile, so that, in a case where a user wants to change the printing conditions, the contents of the print profile can be changed. Also, a print profile can be set for each print job, so that the convenience of use is improved.

The MFSA. NLM of the file server 104 couples, in a case where the print profile is requested to be used, the print profile to the print job data and transfers it to the scanner/printer controller 107.

A command related to paper handling is described in the print profile. In a case where the print profile is requested to be used, the scanner/printer controller 107 overrides the command related to the paper handling described in the actual print data, and makes the command described in the print profile effective.

On the other hand, in a case the print profile is not requested to be used, the MFSA. NLM transfers only the actual print data to the scanner/printer controller 107, and does not transfer the print profile thereto. In this step, the print job operates an ordinary printing.

It should be noted that the MFSA. NLM has a default print profile, so that it is possible to copy the print profile by the printer network utility (software) in the WS 103, give a name of a user thereto, and modify and register the parameters by editing it. Also the print profile having been registered can be edited again, or the title of the profile can be changed.

After it is queued by the print queue on the file server 104, the print job data is taken out time-sequentially, and is transferred to the scanner/printer controller 107. When the print job is taken out from the print queue, and is transferred to the scanner/printer controller 107, the MFSA. NLM checks whether a print profile having the same user's name exists on the print queue or not, and in a case where the print profile having the same user's name exists thereon and is requested to be used, the MFSA. NLM couples the print profile to the header of the print job, and transfers the job to the scanner/printer controller 107 as a new print job file.

On the other hand, in a case where the print profile does not exist thereon, or the use of the print profile is prohibited even if the profile exists thereon, the MFSA. NLM transfers the profile to the scanner/printer controller 107 without coupling the print profile to the print job. In this step, said print job is handled as ordinary print data.

If the scanner/printer controller 107 detects that the print profile is coupled to the print job, the command related to paper handling included in the original print job is replaced for a command defined in the print profile. Accordingly, a user can carry out printing in a form different from the contents of setting set by the printer driver in the WS 103. This function is effective in a client machine operated by DOS, and can effectively be used also in a client machine operated by Windows. For instance, after the contents is set once, paper can always be printed out to the output tray allocated to the user without setting the output tray by the printer driver each time when the output is carried out.

Table 8 shows items described below which can be set and registered to a print profile. It should be noted that command-replaceable items are defined as items for the print profile.

[TABLE 8]

| Items | PS2 language | PCL language | PJL language | PJL enlarged | command replacement |
|---|---|---|---|---|---|
| specifying the number of copied sheets | possible | possible | possible | possible | possible |
| specifying double sided/one sided printing | possible | possible | possible | possible | impossible |
| specifying a paper size | possible | possible | possible limited | possible | impossible |
| specifying a printing direction | possible | possible | possible | possible | impossible |
| specifying a paper feed tray | possible | possible limited | possible limited | possible | possible: PCL, impossible: PS2 |
| specifying a paper discharge tray | possible | possible limited | possible limited | possible | possible |
| specifying a staple | possible | impossible | impossible | possible | possible |
| specifying the assortment | possible | possible | impossible | possible | possible |
| specifying high-speed output | impossible | impossible | impossible | impossible | impossible |
| specifying image collection | possible | possible | impossible | possible | possible |
| specifying resolution | possible | possible | possible limited | possible | possible |
| specifying a completion report | impossible | impossible | impossible | impossible | impossible |
| changing to an automatic paper feed tray | impossible | impossible | impossible | possible | possible |

[7] Network Scanner Function according to the Embodiment

Figure 7:
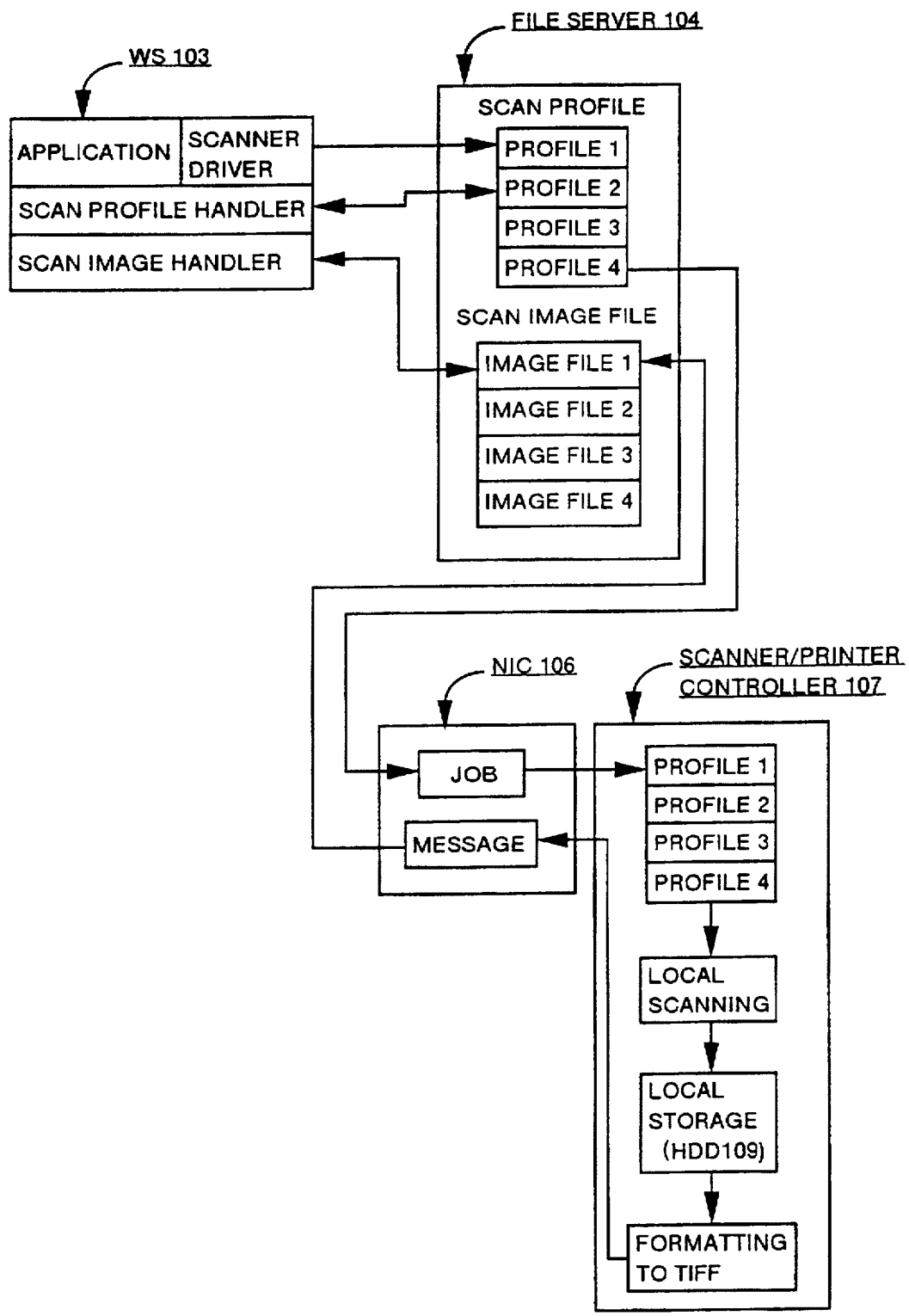
FIG. 7 is an explanatory view showing an operation and a job flow of the network printing in the NetWare environment.

FIG. 7 is an explanatory view showing an operation of the network scanning and an job flow under the NetWare environment.

Incorporated in the WS 103 are a scanner driver, a scan profile handler, and a scan image file handler. It should be noted that the scan profile handler together with the scan image file handler is called as a scanner network utility.

Incorporated in the file server 104 are a scan profile, a scan image file, and software of a MFSA. NLM for controlling the above two (herein, MFSA. NLM/Scanner).

Incorporated in the NIC 106 is software for receiving the scan profile and scan image file from the MFSA. NLM, giving them to the scanner/printer controller 107, receiving the scan image file from the scanner/printer controller 107, and giving it to the MFSA. NLM. These contents of the software is functionally the same as those of the network printer function.

Incorporated in the scanner/printer controller 107 are software for handling the scan profile, displaying it on the operating panel 111, and making it select, software for executing local scanning, and software for giving the scan image file (image file) to the MFSA. NLM through the NIC 106.

An operation of the network scanner function can be divided into three stages described below. It should be noted that operations in these three stages can discretely be carried out from each other in time.

Figure 8:
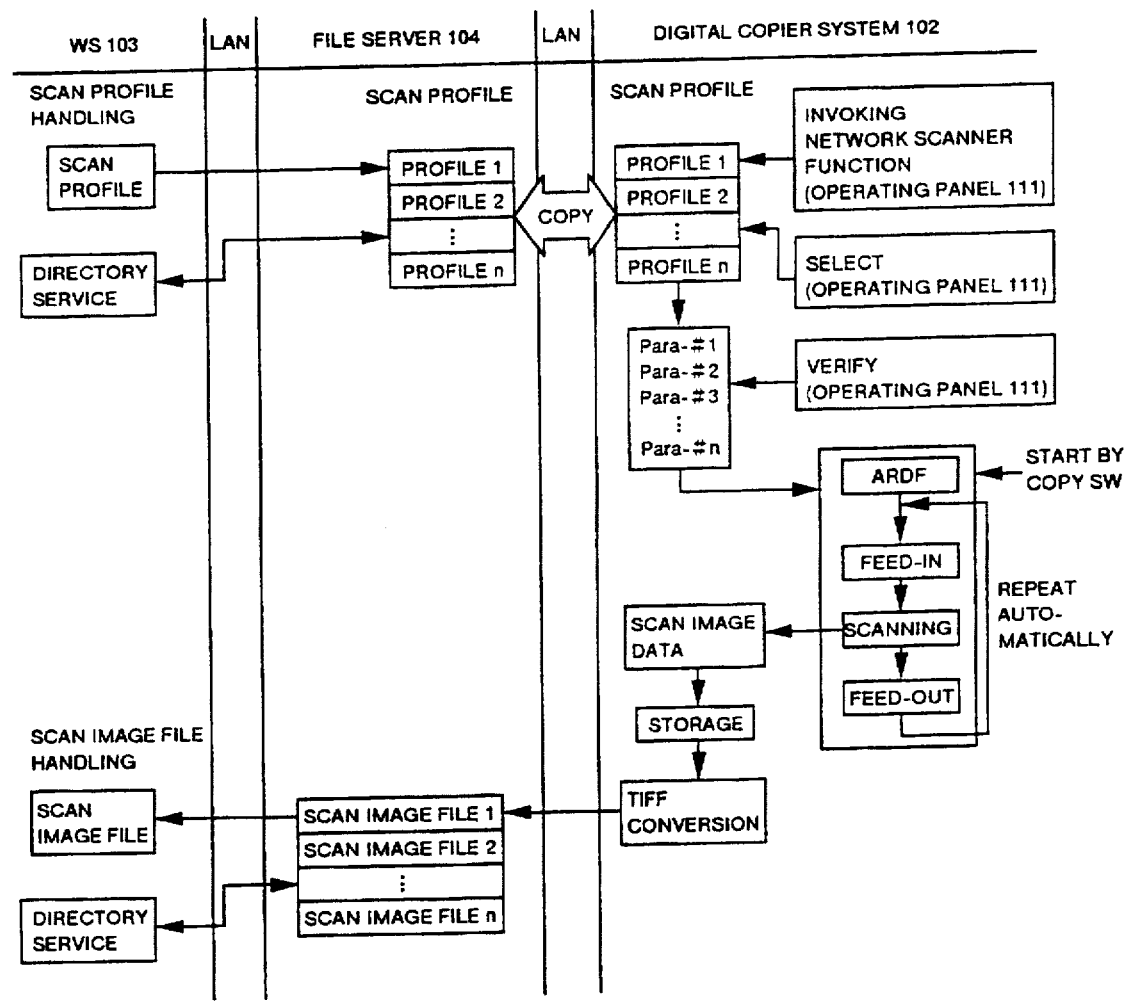
FIG. 8 is an explanatory view showing an operation flow for the function of network scanner.

A first stage: scan profile handling
A second stage: local scanning
A third stage: scan image file handling Next concrete description is made for the contents of work carried out in each stage with reference to FIG. 8. Works described below are carried out in the first stage: scan profile handling.

1) Generation of a scan profile on a WS 103 (work of a scanner driver).

2) Transfer and Registration of the scan profile to the MFSA. NLM on the file server 104 (work of a scanner driver).

3) Display of a list of the scan profile having been registered (work of a scanner network utility or of an OS command).

4) Identification of reading out the scan profile from the MFSA. NLM (work of scanner network utility).

5) Edit and modification of the read-out scan profile (work of scanner network utility).

6) Reregistration of the read-out scan profile (work of scanner network utility).

7) Deletion of the existing scan profile on the MFSA. NLM (work of a scanner network utility or of an OS command).

8) Change of the title of the existing scan profile on the MFSA. NLM (work of a scanner network utility or of an OS command).

9) Validation of preference on scan profiles (work of scanner network utility).

It should be noted that, in the present embodiment, all scan profiles are stored on the file server 104 by the MFSA. NLM. And the scanner/printer controller 107 stores copies of all the scan profiles on the scanner/printer controller 107. Then, in a case where there is some change in any of the scan profiles, the copy thereof on the scanner/printer controller 107 is immediately updated.

A MFSA. NLM of the file server 104 becomes active when the scan profile is transferred to the scanner/printer controller 107. Timing of the case described above is provided when the data is registered anew in the scan profile in the file server 104, when the data is updated, and when a power is started up. Namely, the MFSA. NLM becomes active so that all the scan profiles on the scanner/printer controller 107 will always be maintained in the latest state.

A default scan profile is prepared in the scan profile managed by the MFSA. NLM in the file server 104, and the default scan profile can be copied by the scanner network utility in the WS 103, so that it is possible to change the title of the profile, to edit or modify it, and to reregister the profile.

In another embodiment, the configuration is allowable where all scan profiles are stored only on the file server 104 by the MFSA. NLM, and the copies of the scan profiles are not stored on the scanner/printer controller 107. In this case, the required scan profile on the file server 104 is transferred to the scanner/printer controller 107 according to the request from the scanner/printer controller 107 as requested.

Description below shows items controlled in scan profiles.

a) Specified document size and the direction
b) Specified mode for transferring a document
c) Specified quality of read document
d) Specified resolution
e) Specified scanned area
f) Specified brightness
g) Specified contrast
h) Specified threshold
i) Specified title of an image file
j) Specified parameters of the TIFF Next description is made for the contents of work of the second stage: local scanning with reference to FIG. 8.

1) Initiation of execution of the network scanner function from the operating panel 111

2) Display of a list of titles for the scan profiles on the operating panel 111

However, the latest title of the scan profile preferentially specified by a user (WS 103) should be brought to the header of the list. Also, the title of the scan profile lately used is preferentially displayed at the header portion of the list.

3) Specification and selection of a title of a desired scan profile

It should be noted that as a result, a list of the contents of the scan profiles is displayed.

4) Identifying the list of the contents of the scan profiles
5) Mounting a document on a feeder (ARDF)
6) Pressing a scan-start switch (copy-start switch)

As a result, scan is started. In a case where a multi-document scan is carried out according to the ARDF, feed-in, scanning, and feed-out are automatically repeated until all documents are completed to be scanned.

7) Temporarily compressing a scanned image and accumulating it in the HDD 109

8) After the scanning is completed, taking out the image data from the HDD 109, decompressing it, and converting it to the TIFF under the specified condition again 9) Transferring the TIFF to the MFSA. NLM of the file server 104 through the NIC 106

10) The MFSA. NLM of the file server 104 stores the received TIFF in a memory of the file server 104

To carry out local scanning, the scan profile can be selected through the operating panel 111 on the copier 105. Prior to carry out local scanning from the utility in the WS 103, the scan profile to be selected can be operated. The title of the lately operated scan profile or of the lately used one is displayed at the header of the list.

After the local scanning is completed according to a specified sequence, the scanner/printer controller 107 transfers the stored image file to the MFSA. NLM of the file server 104 through the NIC 106. In a case where the MFSA. NLM is in a state where it can not receive the image file (e.g. due to an insufficient file space, or some trouble in the file server 104 or the like), the image file is stored in the scanner/printer controller 107. After the step, in a case where the MFSA. NLM of the file server 104 can establish communications again, the scanner/printer controller 107 immediately transfers the image file to the MFSA. NLM. In this case, the scanner/printer controller 107 repeats to transfer the image file several times at specified time intervals.

In a case where any space to store the image file is not left in the scanner/printer controller 107 during the local scanning, the scanner/printer controller 107 displays a message of an insufficient memory space on the operating panel 111.

In a case where document feed jam occurs therein during the local scanning, the scanner/printer controller 107 displays the number of sheets of document scanned up to the point of time to identify the continued number of the document, and asks the user about the number of the document to be scanned further. In this step, the scanner/printer controller 107 couples the previously accumulated image file to the image file inputted by the following scanning.

To prevent double feeding of the document, the scanner/printer controller 107 keeps on displaying a number of pages having been scanned on the operating panel 111 while the scanning is being carried out. When all scanning is completed, all the number of pages are displayed thereon, so that the user can learn whether double feeding has eventually been generated or not by identifying the number of sheets of its own document to the number of scanned sheets of the document.

Further, various types of error or trouble may occur during local scanning. In this case, it is required to display an appropriate message on the operating panel 111. Messages described below are displayed in the embodiment.

a) An insufficient memory for execution of the image processing
b) An insufficient capacity of the local hard disk (HDD 109)
c) Impossibility to continue processing due to its complicatedness
d) Unauthorized title of a scan profile
e) Insufficient space for storing therein a file server 104

It should be note that, after the local scanning is completed, the scanner/printer controller 107 displays a title of the corresponding image file on the operating panel 111. Displaying the title of the image file is required for the user to carry out the subsequent processing.

Next description is made for the contents of work of the third stage: scan image file handling with reference to FIG. 8.

1) Taking out an image file on the file server 104 (work of the scanner driver)

2) Identifying the list of the accumulated image files (scan image files) (work of scanner network utility or of an OS command)

3) Displaying a monitored image of the image file (work of scanner network utility)

4) Transferring an image file to the WS 103 (work of scanner network utility or of an OS command)

5) Deleting the image file (work of scanner network utility or of an OS command)

6) Changing the title of the image file (work of scanner network utility or of an OS command)

The MFSA. NLM of the file server 104 does not automatically transfer an image file to the WS 103. All the data related to the whole network scan (both of scan profiles and image files) is accumulated and stored in the file server 104. Then, only in a case where a transfer is requested, the image file is transferred from the file server 104 to the WS 103.

The scanner/printer controller 107 generates a TIFF by using specified parameters. Then an image file in the TIFF format is transferred to the MFSA. NLM on the file server 104 through the NIC106. Parameters of the TIFF are specified by a scan profile.

The scan image file (image file) are identified by names with two types of method described below.

Firstly, in a case where a title is set in a scan profile, a title specified by the scan profile is used as a title of a scan image file. It should be noted that, when a title is set to a scan profile, and in a case where the same title of the scan image file has already been used, warning is given to the WS 103.

Secondary, in a case where a title is not set in a scan profile, a title of a scan profile itself is used as a title of the scan image file. In this step, the title of the scan profile is not changed, but the extension thereof is changed. For instance, nine titles of file from xxxxxxxx. im0 to xxxxxxxx. im9 can be used. It is assumed in this system that one unit of scan job is stored with one file title.

It should be noted that titles of scan image files are managed according to a tree structure. Accordingly, the tree structure appears also on the operating panel 111 of the copier 105.

[8] Status Query Function according to the Present Embodiment

In both the network printer function and the network scanner function according to the system, a status and configuration as a MIB (Management Information Base) can be queried through the SNMP (Simple Network Management Protocol). The SNMP manager as utility software in the WS 103 can take out an NIC MIB, a printer MIB (standard and custom), and a scanner MIB. The query function is carried out through direct communications between the WS 103 and the digital copier system without through the MFSA. NLM of the file server 104

Figure 9:
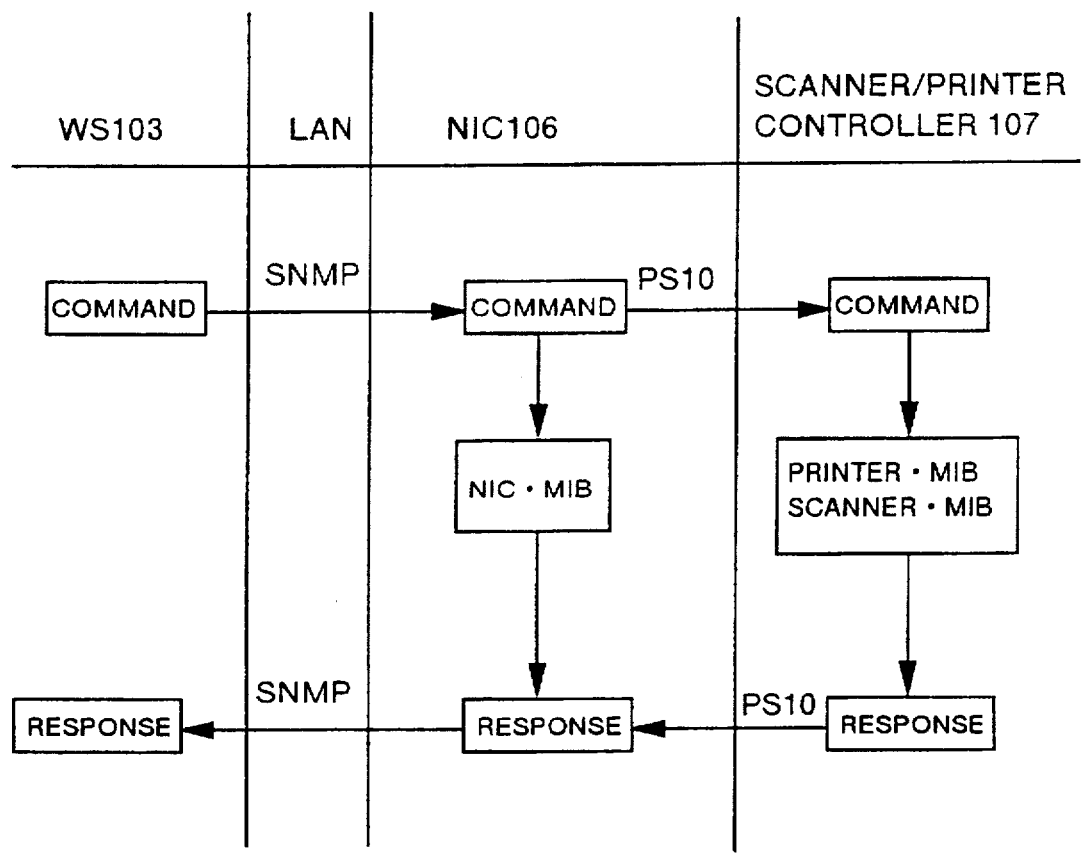
FIG. 9 is an explanatory view showing a mechanism of the status query according to the present embodiment.
Figure 10:
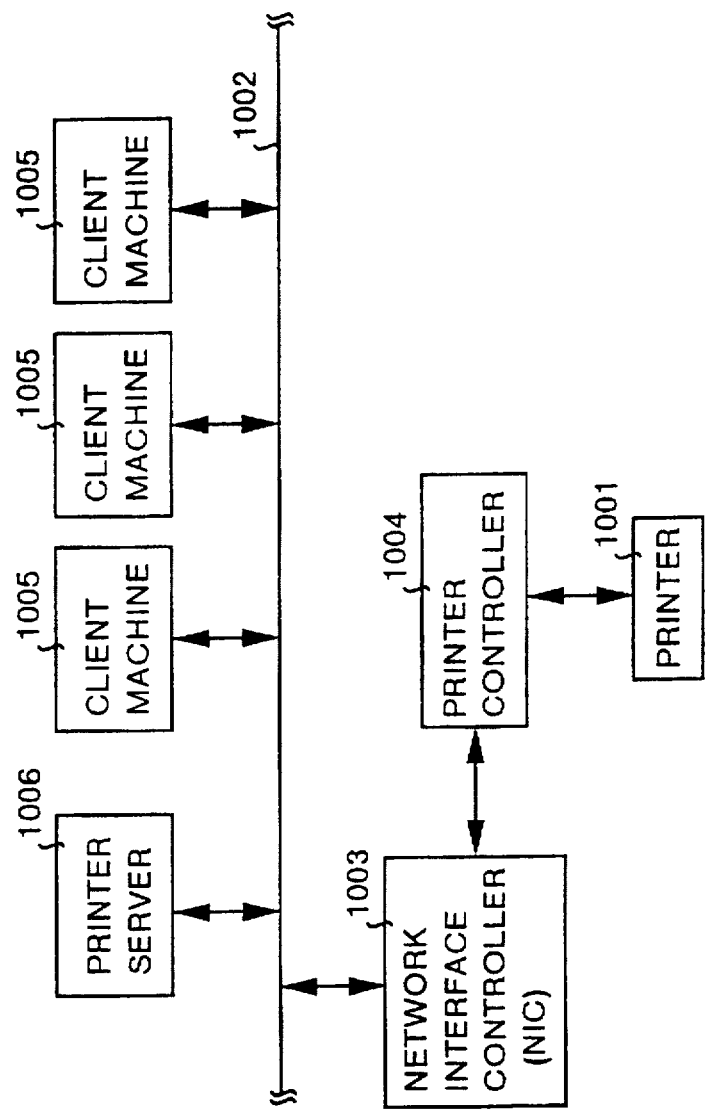
FIG. 10 is an explanatory view schematically showing configuration of the network printing system as an example of the network system based on the conventional technology.

FIG. 9 shows a mechanism of the status query. The NIC106 returns the prepared data as it is as a response if there is a query (command) on the NIC MIB. Also if there is a query (command) on the printer MIB or the scanner MIB, the NIC 106 returns each data for the MIBs as a response by using a command/response (PSIO) defined between the NIC 106 and the scanner/printer controller 107.

Described below are (1) a list of queried items by the printer MIB, (2) a list of queried items from the scanner MIB, and (3) a network managing function required for the utility software in the WS 103.

(1) Queried items by the printer MIB
 a) State of a paper feed tray
  Paper size and setting direction for each tray
  Presence or absence of paper in each tray
 b) A paper discharge tray and the state thereof
  Standard one-bin tray
  One-bin finisher
   presence or absence of overflow
   effectiveness of a staple function
  Three-bin sorter
   state of job assignment
  15-bin sorter
   state of job assignment
   presence or absence of any paper left in any of the trays
 c) State of any printer error
  Serviceman call error
  User recovery-capable error
  Paper jam
  State of supply
  State how the current machine runs
 d) A type and a title of a printer
 e) Configuration of the paper feeder and discharger (2) Queried items from the scanner MIB
 a) State of any scanner error
  Serviceman call error
  User recovery-capable error
  Document jam
  Current state of the machine's operation
 b) Usable memory capacity
 c) Storable capacity of hard disk (3) Network management functions required for utility software in the WS 103

Minimum number of network management functions described below are required for the utility software in the WS 103.

a) Identifying a state of on-line/off-line of a machine
 b) A state of connecting a print queue and a state of connecting a printer
 c) Modification of setting the print queue and selection of a printer
 d) Identifying a stand-by state of jobs in the print queue
 e) Changing a preferential order of the jobs in the print queue
 f) Setting a time interval for queries on identifying the state (an SNMP calling interval)

[9] Printer Driver, Scanner Driver, and Utility

A driver is required regardless of purposes of the network or of whether a machine is stand-alone type (of a printer and a scanner) or not. An interface in a lower level in the WS 103 determines whether each job is to be passed through the network or not, or whether each job is to be passed through each interface for a printer, a scanner, and a copier respectively or not. Herein, description is not made for the interface in the lower level.

The network printing/scanning system according to the embodiment supports printer drivers, scanner drivers, and the utilities each described below.

As a printer driver and the utility, the system supports:
 a) PCL5e/Windows 3.1 Printer Driver
 b) PostScript 2/Windows 3.1 Printer Driver
 c) PostScript 2/Macintosh Printer Driver
 d) TIFF/Windows 3.1 Printer Utility Also, as a scanner driver/ the utility, the system supports:
 a) TWAIN/Windows 3.1 Scanner Driver (for SCSI and virtual)
 b) TWAIN/Macintosh Scanner Driver (for SCSI)
 c) ISIS/Windows 3.1 Scanner Driver (for SCSI and virtual)
 d) ISIS/Macintosh Scanner Driver (for SCSI)

Furthermore, more specified items are described below in the order of [items to be supported by a printer driver] and [items to be supported by a scanner driver].

[Items to be supported by a printer driver]
1) Selecting a paper size
2) Selecting a paper feed tray
   a) Automatic selection
   b) Specifying a physical tray
      Large capacity paper feed tray (LCIT)
      First paper feed tray
      Manual paper feed tray
      Second paper feed tray
      Third paper feed tray
      Forth paper feed tray
3) Specifying a printing direction
   a) Portrait
   b) Landscape
4) Specifying a paper discharge tray
   a) Standard one-bin paper discharge tray
   b) One-bin finisher (option)
   c) Three-bin sorter (option)
      Upper tray
      Middle tray
      Lower tray
   d) 15-bin finisher (option)
      Most-upper tray (No. 1)
      Middle tray (No. 2 to No. 15)
      Interruption tray
5) Setting a number of printed sheets of paper
   a) Standard one-bin paper discharge tray
      Stack by maximum 250 sheets
   b) One-bin finisher (option)
      Stack by maximum 1500 sheets
   c) Three-bin sorter (option)
      Upper tray; stack by maximum 500 sheets
      Middle tray; stack by maximum 250 sheets
      Lower tray; stack by maximum 250 sheets
   d) 15-bin finisher (option)
      Most-upper tray; stack by maximum 150 sheets
      Middle tray; stack by maximum 50 sheets
      Interruption tray; stack by maximum 100 sheets
6) Setting assortment
   a) Standard one-bin paper discharge tray
      Insertion of separating sheet; On/Off
   b) One-bin finisher (option)
      Offset stack; On/Off
   c) Three-bin sorter (option)
      Upper tray; offset stack; On/Off
      Middle/lower tray; insertion of separating sheet; On/Off
   d) 15-bin finisher (option)
      Multi-stage tray; insertion of separating sheet; On/Off
      Interruption tray; insertion of separating sheet; On/Off
7) Specifying a staple function
   a) Staple function; On/Off
   b) Position for stapling
      Stapled at one point at the right above
      Stapled at two points at a center of the left edge
      Stapled at two points at a center of the upper edge
8) Selecting adjustment of an image quality
   a) Smoothing; On/Off
9) Selecting resolution
   a) Standard image (300 dpi)
   b) Detailed image (400 dpi)
   c) Fine image (600 dpi)
10 Specifying a double-sided or a single-sided
   a) single-sided printing
   b) Double-sided printing
      Longitudinal-edge binding
      Latitudinal-edge binding TIFF print utility software generates a print job by coupling the TIFF to printing conditions. The printing conditions are described with JPL in the utility software. The JPL specifies paper handling. However, items for specification of a printing direction and for specification of resolution are excluded from the printing conditions described above.

The TIFF print utility software has to couple the TIFF data to a printing condition file before the printing data is transferred to the printer. It is preferable that a socket is provided in the software as an option so that filter software to convert 8-bit gray scale data for the TIFF to 1-bit half-tone data can be added thereto. The reason is that there is a case where 8-bit gray scale data can not be printed by a printer of a copier 105.

[Items to be supported by a scanner driver]
1) Setting a document size and a method of feeding a document
   a) Paper size and latitudinal-edge feeding
   b) Paper size and longitudinal-edge feeding
2) Specifying a document feeding mode
   a) Scanning a book type document
   b) Scanning a single side and multi-number of pages
      Scanning pages in the normal order (setting documents in face-up mode)
      Scanning pages in the reverse order (setting documents in face-up mode)
   c) Scanning double sides and multi-number of pages
      Scanning pages in the normal order (setting documents in face-up mode)
      Scanning pages in the reverse order (setting documents in face-up mode)
3) Specifying a form of image data to be read
   a) Character/line drawing mode (1-bit monochrome)
   b) Intermediate-tone mode (1-bit half tone)
      Photographed image mode (dither processing)
      (Fine photographed image mode (dither processing (for fine processing))
      Character/photographed image-mixed mode (error diffusion processing)
   c) Gray scale mode (8-bit gray scale)
4) Specifying resolution
   a) Resolution in the X direction (from 25 to 1600 dpi)
   b) Resolution in the Y direction (from 25 to 600 dpi)
   a) Resolution in the XY direction (from 25 to 1600 dpi)
5) Specifying an area to be read
   a) Offset in the X direction
   b) Offset in the Y direction
   c) Length in the X direction
   d) Length in the Y direction
6) Specifying an image quality mode
   a) Ordinary image
   b) Smooth image
   c) Bright image
   d) Linear image
7) Setting a brightness
   a) Shading at 7 levels
8) Setting a contrast
   a) Contrast at 7 levels
9) Setting a threshold
   a) Gray scale at 7 levels 10) Specifying reversion of an image
   a) Presence or absence of reverse; On/Off One to one scanning through a SCSI is always carried out by the scanner driver in the WS 103. A processing flow is described below.

1) Feeding-in documents from an ARDF (only when the ARDF is attached)
   a) Automatically feeding-in a single document
   b) Automatically feeding-in a plurality of documents
2) Setting scanning conditions
3) Receiving scanned data
   a) Pre-scanned data
   b) Finally-scanned data
4) Discharging documents from the ARDF (only when the ARDF is attached)
   a) Automatically discharging a single document
   b) Automatically discharging a plurality of documents Both modes of the normal page order and the reverse page order are required in the network scanner function because the digital copier system 102 according to the present embodiment is constructed based on the copier 105. In a case where the copier 105 is provided therein as a base, document to be read are set on the ARDF with the face up, and scanning is started from the final page of the documents. The documents can most efficiently be fed in this method, and a speed of scanning repeatedly therein is highest. However, there is a problem that pages having been scanned are stacked in the reverse order.

For this reason, to correct this order, In a case of a reverse page order, a scan image file is temporarily generated by each page, and after all scanning is completed, the page order is reversed and is merged as one unit of file.

As described above, the method of reporting a result of execution of a print job in a network system according to the present invention, comprises a first step in which the server machine receives the print job outputted from the plurality of client machines, time-sequentially queues the print job, generates a job ID corresponding to the print job, stores therein the generated job ID, a user ID of the print job, and a connection ID; a second step in which the network interface controller takes out the queued print job on the server machine by each job and transfers the job to the printer controller; a third step in which the printer controller stores a job ID of the print job received from the network interface controller, and carries out the print job; a fourth step in which the printer controller generates an appropriate message based on a state of completion of the print job or on a state of suspension thereof and returns the message together with the job ID to the network interface controller; a fifth step in which the network interface controller receives the message with the job ID included therein from the printer controller and transfers the received message to the server machine; a sixth step in which the server machine time-sequentially queues the message with the job ID included therein received from the printer controller through the network interface controller, checks the job ID of the queued message, specifies a job owner from a user ID and a connection ID corresponding to the job ID, and in a case where the specified job owner exists on the network, the server machine immediately transfers the message to the corresponding client machine; and a seventh step in which the client machine receives the message from the server machine and automatically displays contents of the message on a screen, so that an appropriate message is generated based on a state of completion of the print job or a state of suspension thereof in a printer, and the message can be reported to a user.

The method of setting scanning conditions in a network system according to the present invention comprises a first step in which the client machine generates a scanning profile for specifying scanning conditions such as a document size, reading conditions, and a title of an image file or the like; a second step in which the server machine receives the scan profile from the plurality of client machines, and maintains or stores them therein; a third step in which the server machine, in a case where a power for the scanner controller is started up and in a case where there is any addition to and change of the scanning profile, transfers all scan profiles to the scanner controller through the network interface controller; a fourth step in which the scanner controller receives all the scan profiles from the server machine, and maintains or stores them as copied scan profiles therein; a fifth step in which the scanner controller, in a case where a network scanner function is required through an operating panel of the scanner, displays a list of the copied scan profiles on the operating panel, and makes the scanner select a desired scanning profile; a sixth step in which the scanner controller displays the contents of the selected scan profile on the operating panel, and asks a user to identify it; and a seventh step in which the scanner controller controls the scanner to start a scanning operation according to a start switch being pressed on the operating panel, so that it is possible to provide functions in which the convenience of work for receiving image data from a scanner through a network and the workability thereof can be improved.

In the network printing/scanning system according to the present invention, the server machine comprises a print queue function for time-sequentially queuing print jobs each outputted from the plurality of client machines; a job ID generating function for generating job IDs corresponding to the print jobs; an ID storage function for storing the generated job IDs, user IDs of the print jobs, and connection IDs; a message queue function for time-sequentially queuing messages with job IDs included therein received from the scanner/printer controller through the network interface controller; a job owner specifying function for checking the job ID in the queued message, and specifying a job owner from the user ID and connection ID corresponding to the job ID; a message send-out function for immediately sending out the message to the corresponding client machine in a case where the specified job owner exists on the network; and a deleting function for deleting the message, job ID, user ID, and connection ID after the message is transferred, the network interface controller comprises a print job transferring function for taking out one of the print jobs queued on the server machine by each job, and transferring the job to the scanner/printer controller; and a message transferring function for receiving the message with a job ID included therein from the scanner/printer controller, and transferring the message to the server machine, the scanner/printer controller comprises a print-job executing function for storing the job ID of the print job received from the network interface controller, and also executing the print job; a message generating/returning function for generating an appropriate message and returning the message with the job ID to the network interface controller respectively in a case where the print job is successfully completed or in a case where it is suspended due to some error, the client machine comprises a message displaying function for automatically displaying the contents of a message on a screen in a case where it has received the message from the server machine, so that, in the network printing/scanning system with a copier as a base, an appropriate message is generated based on a state of completion of the print job or a state of suspension thereof in a printer, and the message can be reported to a user, and furthermore it is possible to provide functions in which the convenience of work for receiving image data from a copier through a network and the workability thereof can be improved.

In the network printing/scanning system according to the present invention, the message displaying function comprises software resident on the client machine, so that messages can always be displayed thereon.

In the network printing/scanning system according to the present invention, the client machine comprises a necessity/unnecessity data adding function for adding thereto data thereof, when the print job is outputted to the server machine, as to whether a message for the time when the corresponding print job i s completed or is suspended is required or not, and the server machine has a maintaining function for maintaining or storing the necessity/unnecessity data added to the print job, and a message aborting function for preventing send-out of the message to a job owner by the message send-out function, and aborting the corresponding message in a case where the message is not required, so that the system can control any message not to be received and not to be displayed thereon if not required. More specifically, some users do not require any message for completion of the print job or suspension thereof. For instance, some users may feel troublesome to receive messages during doing another work. In these cases, the system can avoid from reducing the workability without bothering a user.

In the network printing/scanning system according to the present invention, the server machine, in a case where the job owner specified by the job owner specifying function does not exist on the network due to log-out or a power being tuned off, has a message processing terminating function for aborting the corresponding message and terminating the processing, so that even if the job owner logs-out or turns a power OFF without waiting for a message to be returned, any incomplete jobs (messages) are not left on the system. Namely, in a case where there is no destination of a message to be sent back, this type of conflict as a system can be avoided.

In the network printing/scanning system according to present invention, the server machine, in a case where the job owner specified by the job owner specifying function does not exist on the network due to log-out or a power being tuned off, comprises a message queue function for maintaining or storing the corresponding message in the message queue, periodically checking whether the specified job owner logs in again or not, and immediately transfers the message maintained or stored in the message queue when the log-in is identified, so that even if a job owner logs-out or turns a power OFF once without waiting for a message to be returned, the job owner can receive the message if he logs in again. Namely, in a case where there is no destination of a message to be sent back, this type of conflict as a system can be avoided.

In the network printing/scanning system according to the present invention, the message queue function deletes the corresponding message maintained or stored in the message queue in a case where the specified job owner has not logged in again after a specified period of time preset by a manager of the network has past, so that even if the job owner logs-out or turns a power OFF without waiting for a message to be returned, any incomplete jobs (messages) are not left on the system. Namely, in a case where there is no destination of a message to be sent back, this type of conflict as a system can be avoided.

In the network printing/scanning system according to the present invention, a message generated by the message generating/returning function comprises a print-completion report message in a case where all pages have completely been printed out as specified, a paper jam message in a case where the printing is disabled due to a paper jam, a paper end message in a case where the printing is disabled due to paper running out, and an error message in a case where the printing can not be continued due to some machine troubles, so that it is possible to know more specifically about a state of completion of the printing or of suspension thereof according to the message.

In the network printing/scanning system according to the present invention, the server machine comprises a print queue function for time-sequentially queuing print jobs each outputted from the plurality of client machines; a print profile maintaining function for maintaining or storing print profiles for specifying settings of printing conditions such as specifying passage of paper, and finishing the print job in a plurality of files; a user ID storage function for storing user IDs for owners each having a print profile respectively for each the print profile; a print profile linking function for checking whether the print file is stored or not with the identical user ID to the corresponding print job when the print job queued by the print queuing function is transferred to the network interface controller, linking the corresponding profile to a header of the print job and setting an identification flag indicating the linking in a case where a print profile for the identical user ID exists therein, the network interface controller comprises a print job transferring function for taking out one of the print jobs queued on the server machine by each job, and transferring the job to the scanner/printer controller, the scanner/printer controller comprises a command overwrite function for checking whether the print profile is linked to the print job received from the network interface controller or not, and replacing the command related to paper handling included in the print job for a command related to the identical paper handling included in the print profile in a case where the print profile is connected to the print job, and the client machine comprises a print profile reregistering function for editing, modifying, and reregistering the contents of the print profile maintained or stored on the server machine, so that printing conditions can be set for each user by making use of a print profile, and a user can use the conditions. A paper handling function specific to each printer is generally used with a printer driver specifically designed for the printer. However, it is troublesome for a user to specify the paper handling function in the printer driver each time when the printing is carried out. For instance, in a multi-stage paper discharge tray device, it is quite convenient and handy to allocate bins to each user so that the user can always output paper to the allocated output tray. Especially in a case where a DOS-based machine is a client machine, it used to be difficult to supply a printer driver to a user from a printer maker, so that specifying the function with the print profile becomes extremely convenient for a user. In other words, printing conditions can be set for each user with a print profile, and a user can use the conditions, which makes it possible to improve the convenience of use for a user.

In the network printing/scanning system according to the present invention, the print profile maintaining function in the server machine previously maintains or stores print profiles of the default, the print profile reregistering function in the client machine calls up a default print profile onto the server machine, edits and modifies the profile, the profile can be registered anew with the user ID with which the profile is edited and modified, and a flag for setting whether the print profile itself is used or not is provided in the print profile, so that a print profile can easily be set.

In the network printing/scanning system according to the present invention, the server machine comprises a scan profile maintaining function for maintaining or storing scan profiles for setting scanning conditions such as a document size and reading conditions or the like in a plurality of files; a scan profile transferring function for transferring all scan profiles to the scanner/printer controller through the network interface controller in a case where a power for the scanner controller is started up and in a case where there is any addition to or change in the scan profile maintained or stored in the scan profile maintaining function; and a scan image file storage function for storing therein the scan image file transferred from the scanner/printer controller through the network interface controller according to the prespecified filing system, the scanner/printer controller comprises a copied scan profile maintaining function for maintaining or storing the all scan profiles transferred from the server machine as copied scan profiles; a list selecting function for displaying a list of copied scan profiles on the operating panel in a case where the network scanner function is required through the operating panel of the copier, and making it select a desired scan profile; a scan profile identifying function for displaying the contents of the scan profile selected through the list selecting function, and making the user identify it; a scan operation starting function for starting up the scanning operation by controlling the copier when the start switch on the operating panel is pressed; a scan image data accumulating function for temporarily accumulating scan image data read out by the copier; and a scan image file transferring function for converting all scan image data to specified formats and transferring them to the server machine as scan image files after all the documents have been scanned, and the client machine comprises a scan profile reregistering function for editing, modifying, and reregistering the contents of the scan profile maintained or stored on the server machine, and a scan image file reading function for reading the scan image file stored by the scan image file storage function of the server machine and handling the file as an ordinary image file, so that it is possible to provide functions in which the convenience of work for receiving image data from the scanner through the network and the workability thereof are improved. Especially a network scanner function has not been defined as a general concept, and in local scanning with a scan profile, a method of using a scanner in its new concept can be provided to a user. Also by using a scan profile, high-convenience of use to fixed work (routine work) can be provided.

In the network printing/scanning system according to the present invention, the scan profile maintaining function in the server machine previously maintains or stores default scan profiles, and the scan profile reregistering function in the client machine calls up a default scan profile on the server machine, edits and modifies the profile, and can set a title of a scan profile anew for registration, and also the same user can set a plurality of scan profiles, so that a scan profile can easily be set.

In the network printing/scanning system according to the present invention, a preference of scan profiles to be used can be set by the scan profile reregistering function of the client machine, and the list of copied scan profiles is displayed according to the set preference in the list selecting function of the scanner/printer controller, so that, when local scanning is carried out, which scan profile is to be scanned can be specified from the client machine, and even in a case where the scanning is carried out through the copier provided in a place apart therefrom, the scanning can easily be requested to a third person, and for this reason the convenience of use can be improved.

In the network printing/scanning system according to the present invention, the scan profile can be registered in a tree-structured directory system in which subdirectory can be set by the scan profile reregistering function of the client machine, and when a list of the copied scan profile is displayed, the list of the scan profile is displayed in a tree-structured directory system by the list selecting function of the scanner/printer controller, so that scan profiles can easily be managed, and the operability thereof can be improved.

In the network printing/scanning system according to the present invention, the scanner/printer controller comprises a title displaying function for displaying a title of the scan image data accumulated by the scan image data accumulating function on the operating panel at a point of time when the scanning is finished; a page number displaying function for displaying a page number each time when scanning is finished in a case where a multi-document is scanned by using an ADRF (automatic document reverse feeder); an error displaying function for displaying contents of the error in a case where any error occurs in the middle of scanning; a rescanning demanding function for displaying a message in which a necessary page number is displayed and rescanning is demanded from the corresponding page on the operating panel in a case where the scanning can be continued under the error; and a scan image data deleting function for automatically deleting the scan image data temporarily accumulated until then in a case where the scanning can be continued under the error, so that a display of pages to be scanned, a display of a title of a scan image file when it is finished, and a display of the number of scanned pages can be carried out on the operating panel. Accordingly, a restarted page when the printer is recovered from the paper jam can easily be identified, the convenience of use when the after-processing is carried out is improved, and any document repeatedly transferred can easily be found.

In the network printing/scanning system according to the present invention, the scan image file transferring function in the scanner/printer controller stores therein the corresponding scan image file, and automatically repeats to transfer the corresponding scan image file at a specified time intervals in a case where the scan image file can not be transferred for some reasons after the scanning of all the document is finished, so that even if any inconvenience occurs in a server machine, scanning can be carried out, and for this reason, a degree of completion as a system can be enhanced.

In the network printing/scanning system according to the present invention, the scan profile comprises items each for defining a title of the scan image file and items each for defining a format such as a compressed format of the scan image file or the like, and the scan image file transferring function of the scanner/printer controller handles the plurality of scan image data obtained by one unit of scanning job as one unit of scan image file, converts the format of the scan image data according to the format defined by the scanning profile, and transfers the data as one unit of scan image file, so that, by writing a sequence of after-processing into a scan profile, the operability of the whole system can be improved, and a degree of completion as a system can be enhanced.

In the network printing/scanning system according to the present invention, the scan image data accumulating function of the scan profile accumulates scan image data by each page, and the scan image file transferring function of the scanner/printer controller reads out the accumulated scan image data in the decreasing order of the pages, converts the format of the scan image data, and transfers the data as one unit of scan image file after the scanning of all the document is finished, so that scanning can be executed at the maximum speed which the digital copier system can make, and at the same time an order of pages of copied paper can be arranged as the documents are arranged. Also when scan image data is temporarily accumulated, the data can be stored by each page, and in a case where document jam occurs, the scanning can be continued without any difficulty, and a degree of completion as a system can be enhanced.

In the network printing/scanning system according to the present invention, the server machine comprises a scan profile maintaining function for maintaining or storing scan profiles for setting scanning conditions such as a document size and reading conditions or the like in a plurality of files; a sscan profile transferring function for transferring a list of all scan profiles to the scanner/printer controller in a case where the list of all the scan profiles is requested to be transferred from the scanner/printer controller, and transferring the corresponding scan profile thereto in a case where a particular scan profile is requested to be transferred; and a scan image file storage function for storing therein the scan image file transferred from the scanner/printer controller through the network interface controller according to the prespecified filing system, the scanner/printer controller comprises a list selecting function for outputting a request of transferring all the scan profiles to the server machine in a case where the network scanner function is requested through the operating panel of the copier, displaying a list of all the scan profiles transferred from the server machine on the operating panel, and making it select a desired scan profile; a scan profile identifying function for outputting a request of transferring the scan profile selected by the list selecting function, displaying the contents of the corresponding scan profile on the operating panel, and making the user identify it; a scan operation starting function for starting up the scanning operation by controlling the copier when the start switch on the operating panel is pressed; a scan image data accumulating function for temporarily accumulating scan image data read out by the copier; and a scan image file transferring function for converting all scan image data to specified formats and transferring them to the server machine as scan image files after all the documents have scanned, and the client machine comprises a scan profile reregistering function for editing, modifying, and reregistering the contents of the scan profile stored on the server machine, and a scan image file reading function for reading the scan image file stored by the scan image file storage function of the server machine, and handling the file as an ordinary image file, so that it is possible to provide functions in which the convenience of work for receiving image data from a scanner through a network and the workability thereof can be improved. Especially a network scanner function has not been defined as a general concept, and for this reason, in local scanning using a scan profile, a method of using a scanner having a new concept can be provided to a user. Also by using a scan profile, high-convenience can be provided to fixed work (routine work).

Furthermore, all scan profiles are stored only on the server machine, and a scan profile is not resident in a scanner/printer controller side, so that, for instance, as compared to a case where all scan profiles are resident on both the server machine and a scan profile, for instance, a situation, in which a user is selecting one of scan profiles on the operating panel of the copier, and concurrently another user is modifying the contents of the same scan profile from a client machine, can be prevented.

This application is based on Japanese patent application No. HEI 7-248187 filed in the Japanese Patent Office on Sep. 26, 1995, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method of reporting a result of execution of a print job in a network system comprising a printer; a network interface controller for connecting said printer to the network; a printer controller for converting a print data stream inputted thereto through said network interface controller to printable image data, outputting the data to said printer, and also controlling said printer; a plurality of client machines each connected to said network; and a server machine for connecting said printer and said printer controller each to said plurality of client machines through said network and said network interface controller, and providing various types of service, said method comprising:

a first step in which said server machine receives the print job outputted from said plurality of client machines, time-sequentially queues said print job, generates a job ID corresponding to said print job, stores therein said generated job ID, a user ID of said print job, and a connection ID, a second step in which said network interface controller takes out the queued print job on said server machine by each job and transfers the job to said printer controller, a third step in which said printer controller stores a job ID of the print job received from said network interface controller, and carries out the print job, a fourth step in which said printer controller generates an appropriate message based on a state of completion of said print job or on a state of suspension thereof and returns the message together with the job ID to said network interface controller, a fifth step in which said network interface controller receives the message with the job ID included therein from said printer controller and transfers the received message to said server machine, a sixth step in which said server machine time-sequentially queues the message with the job ID included therein received from the printer controller through said network interface controller, checks the job ID of said queued message, specifies a job owner from a user ID and a connection ID corresponding to the job ID, and in a case where said specified job owner exists on said network, the server machine immediately transfers said message to the corresponding client machine, and a seventh step in which said client machine receives the message from said server machine and automatically displays contents of the message on a screen.

2. A method of setting scanning conditions in a network system comprising a scanner; a network interface controller for connecting said scanner to the network; a scanner controller for controlling said scanner; a plurality of client machines each connected to said network; and a server machine for connecting said scanner and said scanner controller each to said plurality of client machines through said network and said network interface controller, and providing various types of service, said method comprising:

- a first step in which said client machine generates a scanning profile for specifying scanning conditions such as a document size, reading conditions, and a title of an image file,
- a second step in which said server machine receives said scan profile from said plurality of client machines, and maintains or stores them therein,
- a third step in which said server machine, in a case where a power for said scanner controller is started up and in a case where there is any addition to and change of said scanning profile, transfers all scan profiles to said scanner controller through said network interface controller,
- a fourth step in which said scanner controller receives all the scan profiles from said server machine, and maintains or stores them as copied scan profiles therein,
- a fifth step in which said scanner controller, in a case where a network scanner function is required through an operating panel of said scanner, displays a list of the copied scan profiles on said operating panel, and makes the scanner select a desired scanning profile,
- a sixth step in which said scanner controller displays the contents of said selected scan profile on said operating panel, and asks a user to identify it, and
- a seventh step in which said scanner controller controls said scanner to start a scanning operation according to a start switch being pressed on said operating panel.

3. A network printing/scanning system comprising:

- a network-compatible type of digital copier system comprising a copier including therein a scanner and a printer, a network interface controller for connecting said copier to a network, and a scanner/printer controller for converting a print data stream received thereby through said network interface controller to printable image data, outputting the data to said copier, and also controlling said copier;
- a plurality of client machines each connected to said network; and
- a server machine for connecting said digital copier system to said plurality of client machines through said network, and providing various types of service; wherein
- said server machine comprises a print queue function for time-sequentially queuing print jobs each outputted from said plurality of client machines; a job ID generating function for generating job IDs corresponding to said print jobs; an ID storage function for storing said generated job IDs, user IDs of said print jobs, and connection IDs; a message queue function for time-sequentially queuing messages with job IDs included therein received from the scanner/printer controller through said network interface controller; a job owner specifying function for checking the job ID in the queued message, and specifying a job owner from the user ID and connection ID corresponding to the job ID; a message send-out function for immediately sending out said message to the corresponding client machine in a case where said specified job owner exists on said network; and a deleting function for deleting said message, job ID, user ID, and connection ID after said message is transferred,
- said network interface controller comprises a print job transferring function for taking out one of the print jobs queued on said server machine by each job, and transferring the job to said scanner/printer controller; and a message transferring function for receiving the message with a job ID included therein from said scanner/printer controller, and transferring the message to said server machine,
- said scanner/printer controller comprises a print job executing function for storing the job ID of the print job received from said network interface controller, and also executing said print job; a message generating/returning function for generating an appropriate message and returning the message with the job ID to said network interface controller respectively in a case where said print job is successfully completed or in a case where it is suspended due to some error, and
- said client machine comprises a message displaying function for automatically displaying contents of a message on a screen in a case where it has received the message from said server machine.

4. A network printing/scanning system according to claim 3, wherein said message displaying function comprises software resident on said client machine.

5. A network printing/scanning system according to claim 3, wherein said client machine comprises a necessity/unnecessity data adding function for adding thereto data thereof, when said print job is outputted to said server machine, as to whether a message for the time when the corresponding print job is completed or is suspended is required or not, and said server machine has a maintaining function for maintaining or storing the necessity/unnecessity data added to said print job, and a message aborting function for preventing send-out of the message to a job owner by said message send-out function, and aborting the corresponding message in a case where the message is not required.

6. A network printing/scanning system according to claim 3, wherein said server machine, in a case where the job owner specified by said job owner specifying function does not exist on said network due to log-out or a power being tuned off, has a message-processing terminating function for aborting the corresponding message and terminating the processing.

7. A network printing/scanning system according to claim 3, wherein said server machine, in a case where the job owner specified by said job owner specifying function does not exist on said network due to log-out or a power being tuned off, has a message queue function for maintaining or storing the corresponding message in the message queue, periodically checking whether said specified job owner logs in again or not, and immediately transfers the message maintained or stored in the message queue when the log-in is identified.

8. A network printing/scanning system according to claim 7, wherein said message queue function deletes the corresponding message maintained or stored in said message queue in a case where said specified job owner has not logged in again after a specified period of time, previously set by a manager of the network, has past.

9. A network printing/scanning system according to claim 3, wherein a message generated by said message generating/returning function comprises a print-completion report message in a case where all pages have completely been printed out as specified, a paper jam message in a case where the printing is suspended due to paper jam, a paper end message in a case where the printing is suspended due to paper running out, and an error message in a case where the printing can not be continued due to troubles with said printer.

10. A network printing/scanning system comprising:

a network-compatible type of digital copier system comprising a copier including therein a scanner and a printer, a network interface controller for connecting said copier to a network, and a scanner/printer controller for converting a print data stream received thereby through said network interface controller to printable image data, outputting the data to said copier, and also controlling said copier;

a plurality of client machines each connected to said network; and a server machine for connecting said digital copier system to said plurality of client machines through said network, and providing various types of service; wherein said server machine comprises a print queue function for time-sequentially queuing print jobs each outputted from said plurality of client machines; a print profile maintaining function for maintaining or storing print profiles for specifying settings of printing conditions such as specifying passage of paper, and finishing the print job in a plurality of files; a user ID storage function for storing user IDs for owners each having a print profile respectively for each a print file; a print profile linking function for checking whether said print file is stored or not with the identical user ID to the corresponding print job when the print job queued by said print queue function is transferred to the network interface controller, linking the corresponding profile to a header of said print job and setting an identification flag indicating the linking in a case where a print profile for the identical user ID exists therein, said network interface controller comprises a print-job transferring function for taking out one of the print jobs queued on said server machine in units of job, and transferring the job to said scanner/printer controller, said scanner/printer controller comprises a command overwrite function for checking whether said print profile is linked to the print job received from said network interface controller or not, and replacing the command related to paper handling included in said print job for a command related to the identical paper handling included in said print job in a case where said print profile is connected to the print job, and said client machine comprises a print profile reregistering function for editing, modifying, and reregistering the contents of the print profile stored on said server machine.

11. A network printing/scanning system according to claim 10, wherein the print profile maintaining function in said server machine previously maintains or stores print profiles of a default, the print profile reregistering function in said client machine calls up a default print profile onto said server machine, edits and modifies the profile, the profile can be registered with the user ID with which the profile is edited and modified, and a flag for setting whether the print profile itself is used or not is provided in said print profile.

12. A network printing/scanning system comprising:

a network-compatible type of digital copier system comprising a copier including therein a scanner and a printer, a network interface controller for connecting said copier to a network, and a scanner/printer controller for converting a print data stream received thereby through said network interface controller to printable image data, outputting the data to said copier, and also controlling said copier;

a plurality of client machines each connected to said network; and a server machine for connecting said digital copier system to said plurality of client machines through said network, and providing various types of service; wherein said server machine comprises a scan profile maintaining function for maintaining or storing scan profiles for setting scanning conditions such as a document size and reading conditions in a plurality of files; a scan profile transferring function for transferring all scan profiles to said scanner/printer controller through said network interface controller in a case where a power for said scanner/printer controller is started up and in a case where there is any addition to or change in said scan profile maintained in said scan profile maintaining function; and a scan image file storage function for storing therein the scan image file transferred from said scanner/printer controller through said network interface controller according to a prespecified filing system, said scanner/printer controller comprises a copied scan profile maintaining function for maintaining or storing all the scan profiles transferred from said server machine as copied scan profiles; a list selecting function for displaying a list of copied scan profiles on an operating panel of said copier in a case where a network scanner function is required through the operating panel of said copier, and making it select a desired scan profile; a scan profile identifying function for displaying the contents of the scan profile selected through said list selecting function, and making the user identify it; a scan operation starting function for starting up the scanning operation by controlling said copier when a start switch on said operating panel is pressed; a scan image data accumulating function for temporarily accumulating scan image data read out by said copier; and a scan image file transferring function for converting all scan image data to specified formats and transferring them to said server machine as scan image files after all documents have been scanned, and said client machine comprises a scan profile reregistering function for editing, modifying, and reregistering the contents of the scan profile maintained or stored on said server machine, and a scan image file reading function for reading the scan image file stored by the scan image file storage function of said server machine and handling the file as an ordinary image file.

13. A network printing/scanning system according to claim 12, wherein the scan profile maintaining function in said server machine previously maintains or stores print profiles of a default, and the scan profile reregistering function in said client machine calls up a scan profile of the default on said server machine, edits and modifies the profile, and can set a title of the scan profile for registration, and the same user can set a plurality of scan profiles.

14. A network printing/scanning system according to claim 12, wherein a preference of scan profiles to be used can be set by the scan profile reregistering function of said client machine, and a list of copied scan profiles is displayed according to set said preference in the list selecting function of said scanner/printer controller.

15. A network printing/scanning system according to claim 12, wherein said scan profile can be registered in a tree-structured directory system in which subdirectory can be set in the scan profile reregistering function of said client machine, and when a list of the copied scan profiles is displayed, the list of said scan profile is displayed in the tree-structured directory system by the list selecting function of said scanner/printer controller.

16. A network printing/scanning system according to claim 12, wherein said scanner/ printer controller comprises a title displaying function for displaying a title of the scan image data accumulated by said scan image data accumulating function on said operating panel at a point of time when scanning is finished; a page number displaying function for displaying a page number each time when scanning is finished in a case where a multi-document is scanned by using an ADRF (automatic document reverse feeder); an error displaying function for displaying contents of an error in a case where any error occurs in the middle of the scanning; a rescanning demanding function for displaying a message in which a necessary page number is displayed and rescanning is demanded from the corresponding page on said operating panel in a case where the scanning can be continued under the error; and a scan image data deleting function for automatically deleting the scan image data temporarily accumulated until when in a case where the scanning can be continued under said error.

17. A network printing/scanning system according to claim 12, wherein the scan image file transferring function in said scanner/printer controller stores therein the corresponding scan image file, and automatically, repeats to, transfer the corresponding scan image file at a specified time intervals in a case where the scan image file can not be transferred for some reason after the scanning of all the documents is finished.

18. A network printing/scanning system according to claim 12, wherein said scanning profile comprises items each for defining a title of said scan image file and items each for defining a format such as a compressed format of said scan image file, and the scan image file transferring function of said scanner/printer controller handles a plurality of scan image data obtained by one unit of scan job as one unit of scan image file, converts the format of said scan image data according to the format defined by said scanning profile, and transfers the data as one unit of scan image file.

19. A network printing/scanning system according to claim 12, wherein the scan image data accumulating function of said scanner/printer controller accumulates scan image data by each page, and the scan image file transferring function of said scanner/printer controller reads out the accumulated scan image data in the decreasing order of the pages, converts the format of said scan image data, and transfers the data as one unit of scan image file after the scanning of all the documents is finished.

20. A network printing/scanning system comprising;
a network-compatible type of digital copier system comprising a copier including therein a scanner and a printer, a network interface controller for connecting said copier to a network, and a scanner/printer controller for converting a print data stream received thereby through said network interface controller to printable image data, outputting the data to said copier, and also controlling said copier;

a plurality of client machines each connected to said network; and a server machine for connecting said digital copier system to said plurality of client machines through said network, and providing various types of service; wherein said server machine comprises a scan profile maintaining function for maintaining or storing scan profiles for setting scanning conditions such as a document size and reading conditions in a plurality of files; a scan profile transferring function for transferring a list of all scan profiles to said scanner/printer controller in a case where a list of all the scan profiles are requested to be transferred from said scanner/printer controller, and transferring the corresponding scan profile thereto in a case where a particular scan profile is requested to be transferred; and a scan image file storage function for storing therein the scan image file transferred from said scanner/printer controller through said network interface controller according to a prespecified filing system, said scanner/printer controller comprises a list selecting function for outputting a request of transferring all the scan profiles to said server machine in a case where the network scanner function is requested through a operating panel of said copier, displaying the list of all the scan profiles transferred from the server machine on said operating panel, and making the scanner select a desired scan profile; a scan profile identifying function for outputting a request of transferring the scan profile selected by said list selecting function, displaying the contents of the corresponding scan profile on said operating panel, and making the user identify it; a scan operation starting function for starting up the scanning operation by controlling said copier when a start switch on said operating panel is pressed; a scan image data accumulating function for temporarily accumulating scan image data read out by said copier; and a scan image file transferring function for converting all scan image data to specified formats and transferring them to said server machine as scan image files after all documents have scanned, and said client machine comprises a scan profile reregistering function for editing, modifying, and reregistering the contents of the scan profile stored on said server machine, and a scan image file reading function for reading the scan image file stored by the scan image file storage function of said server machine and handling the file as an ordinary image file.

* * * * *